(12) United States Patent
Favor

(10) Patent No.: US 7,797,517 B1
(45) Date of Patent: Sep. 14, 2010

(54) TRACE OPTIMIZATION VIA FUSING OPERATIONS OF A TARGET ARCHITECTURE OPERATION SET

(75) Inventor: John Gregory Favor, Scotts Valley, CA (US)

(73) Assignee: Oracle America, Inc., Redwood City, CA (US)

(*) Notice: Subject to any disclaimer, the term of this patent is extended or adjusted under 35 U.S.C. 154(b) by 275 days.

(21) Appl. No.: 11/561,274

(22) Filed: Nov. 17, 2006

Related U.S. Application Data

(60) Provisional application No. 60/738,225, filed on Nov. 18, 2005, provisional application No. 60/832,848, filed on Jul. 23, 2006, provisional application No. 60/832,822, filed on Jul. 23, 2006, provisional application No. 60/866,203, filed on Nov. 16, 2006, provisional application No. 60/866,205, filed on Nov. 16, 2006.

(51) Int. Cl.
*G06F 7/38* (2006.01)
*G06F 9/00* (2006.01)
*G06F 9/44* (2006.01)

(52) U.S. Cl. .................. 712/226; 712/22; 712/215

(58) Field of Classification Search ............ 712/226, 712/22, 215
See application file for complete search history.

(56) References Cited

U.S. PATENT DOCUMENTS

| | | | |
|---|---|---|---|
| 4,912,707 A | 3/1990 | Kogge et al. | |
| 5,381,533 A | 1/1995 | Peleg et al. | |
| 5,491,793 A | 2/1996 | Somasundaram et al. | |
| 5,568,380 A | 10/1996 | Brodnax et al. | |
| 5,632,023 A | 5/1997 | White et al. | |
| 5,649,136 A | 7/1997 | Shen et al. | |
| 6,014,742 A | 1/2000 | Krick et al. | |
| 6,018,786 A | 1/2000 | Krick et al. | |
| 6,031,992 A | 2/2000 | Cmelik et al. | |
| 6,055,630 A | 4/2000 | D'Sa et al. | |
| 6,073,213 A | 6/2000 | Peled et al. | |
| 6,076,144 A | 6/2000 | Peled et al. | |
| 6,115,809 A | 9/2000 | Mattson, Jr. et al. | |
| 6,170,038 B1 | 1/2001 | Krick et al. | |
| 6,185,660 B1 | 2/2001 | Mulla et al. | |

(Continued)

OTHER PUBLICATIONS

Meleis et al., "Scheduling Superblocks with Bound-Based Branch Trade-Offs", Aug. 2001.*

(Continued)

*Primary Examiner*—Alford W Kindred
*Assistant Examiner*—Jesse R Moll
(74) *Attorney, Agent, or Firm*—Osha Liang LLP

(57) ABSTRACT

Reference architecture instructions are translated into target architecture operations. Sequences of operations, in a predicted execution order in some embodiments, form traces. In some embodiments, a trace is based on a plurality of basic blocks. In some embodiments, a trace is committed or aborted as a single entity. Sequences of operations are optimized by fusing collections of operations; fused operations specify a same observable function as respective collections, but advantageously enable more efficient processing. In some embodiments, a collection comprises multiple register operations. Fusing a register operation with a branch operation in a trace forms a fused reg-op/branch operation. In some embodiments, branch instructions translate into assert operations. Fusing an assert operation with another operation forms a fused assert operation. In some embodiments, fused operations only set architectural state, such as high-order portions of registers, that is subsequently read before being written.

16 Claims, 10 Drawing Sheets

U.S. PATENT DOCUMENTS

| | | | |
|---|---|---|---|
| 6,185,675 | B1 | 2/2001 | Kranich et al. |
| 6,189,141 | B1 | 2/2001 | Benitez et al. |
| 6,205,545 | B1 | 3/2001 | Shah et al. |
| 6,216,206 | B1 | 4/2001 | Peled et al. |
| 6,351,844 | B1 | 2/2002 | Bala |
| 6,442,674 | B1 | 8/2002 | Lee et al. |
| 6,449,714 | B1 | 9/2002 | Sinharoy |
| 6,538,997 | B1 | 3/2003 | Wang et al. |
| 6,604,060 | B1 | 8/2003 | Ryan et al. |
| 6,609,189 | B1 | 8/2003 | Kuszmaul et al. |
| 6,671,766 | B1 | 12/2003 | Vandenbergh et al. |
| 6,799,263 | B1 | 9/2004 | Morris et al. |
| 6,895,460 | B2 | 5/2005 | Desoli et al. |
| 6,950,924 | B2 | 9/2005 | Miller et al. |
| 6,988,190 | B1 | 1/2006 | Park |
| 7,003,629 | B1 | 2/2006 | Alsup |
| 7,133,969 | B2 | 11/2006 | Alsup et al. |
| 7,136,992 | B2 | 11/2006 | Maiyuran et al. |
| 7,139,902 | B2 | 11/2006 | Lee |
| 7,213,126 | B1 | 5/2007 | Smaus et a |
| 7,360,024 | B2 | 4/2008 | Hironaka et al. |
| 7,366,875 | B2 | 4/2008 | Rasche et al. |
| 7,478,276 | B2 | 1/2009 | Bishop et al. |
| 7,546,420 | B1 | 6/2009 | Shar et al. |
| 7,594,111 | B2 | 9/2009 | Kiriansky et al. |
| 2001/0032307 | A1 | 10/2001 | Rohlman et al. |
| 2002/0095553 | A1 | 7/2002 | Mendelson et al. |
| 2002/0144101 | A1 | 10/2002 | Wang et al. |
| 2003/0005271 | A1 | 1/2003 | Hsu et al. |
| 2003/0084375 | A1 | 5/2003 | Moore et al. |
| 2004/0083352 | A1 | 4/2004 | Lee |
| 2004/0107336 | A1 | 6/2004 | Douglas et al. |
| 2004/0193857 | A1 | 9/2004 | Miller et al. |
| 2005/0125632 | A1 | 6/2005 | Alsup et al. |
| 2005/0289324 | A1 | 12/2005 | Miller et al. |
| 2005/0289529 | A1* | 12/2005 | Almog et al. ............... 717/158 |

OTHER PUBLICATIONS

Dubey et al., Instruction Window Size Trade-Offs and Characterization of Program Parallelism, Apr. 1994.*

Almog, Y. et al., "Specialized Dynamic Optimizations for High-Performance Energy-Efficient Microarchitecture", Proceedings of the International Symposium on Code Generation and Optimization, 2004 (12 pages).

Chaparro, P. et al., "Distributing the Fronted for Temperature Reduction", Proceedings of the 11th Symposium on High-Performace Computer Architecture, Feb. 12-16, 2005 (10 pages).

Colwell, R. P. et al., "A VLIW Architecture for a Trace Scheduling Compiler", 1987, pp. 180-192 (13 pages).

Fisher, J. A., "Trace Scheduling: A Technique for Global Microcode Compaction", IEEE Transactions on Computers, vol. C-30, No. 7, Jul. 1981, pp. 478-490 (13 pages).

Friendly, D. et al, "Putting the Fill Unit to Work: Dynamic Optimizations for Trace Cache Microprocessors", Proceedings of the 31st Annual ACM/IEEE International Symposium on Microarchitecture, Nov. 30-Dec. 2, 1998, pp. 173-181 (9 pages).

Grunwald, D. and Ghiasi, S., "Microarchitectural Denial of Service: Insuring Microarchitectural Fairness", Proceedings of the 35th Annual IEEE/ACM International Symposium on Microarchitecture, Nov. 18-22, 2002 (10 pages).

Hinton, G. et al., "The Microarchitecture of the Pentium 4 Processor", Intel Technology Journal Q1, 2001 (12 pages).

Rotenberg, E., Bennett, S., and Smith, J. E., "Trace Cache: a Low Latency Approach to High Bandwidth Instruction Fetching", In Proceedings of the 29th Annual International Symposium on Microarchitecture, Dec. 2-4, 1996, Paris, France (11 pages).

Slechta, B. et al, "Dynamic Optimization of Micro-Operations", Proceedings of The 9th International Symposium on High-Performance Computer Architecture, Feb. 8-12, 2003 (12 pages).

Smith, J. E. and Pleszkun, A. R., "Implementation of Precise Interrupts in Pipelined Processors", Proc. Computer Architecture, 1985 (15 pages).

Vijaykumar, T. N., et al., "Speculative Versioning Cache", IEEE Transaction on Parallel and Distributed Systems, vol. 12, No. 12, Dec. 2001, pp. 1305-1317 (13 pages).

Phillips, J. E., "High Performance Execution Engines for Instruction Level Parallel Processors", Austin, Texas, Jun. 1996 (190 pages).

Katevenis, E. G., "Reduced Instruction Set Computer Architectures for VLSI", Berkeley, California 1983, pp. 67-68 and 190 (7 pages).

Tremblay, M., "High-Performance Fault-Tolerant VLSI Systems Using Micro Rollback", Los Angeles, California, Sep. 1991, pp. 72-74, 81, 89-90, 102-104 and 246 (14 pages).

Patel, S., Lumetta, S., "rePlay: A Hardware Framework for Dynamic Optimization", IEEE Transactions on Computers, vol. 50, No. 6, Jun. 2001 (19 pages).

Tanenbaum, A.S., "Structured Computer Organization", Prentice-Hall, 2nd Edition, 1984, p. 11 (3 pages).

Tanenbaum, A. S., Structured Computer Organization, Fourth Edition, Prentice Hall, Inc. 1984 (21 pages).

Patel S. J. et al., Improving Trace Cache Effectiveness with Branch Promotion and Trace Packing, IEEE, 1998, pp. 262-271.

Tanenbaum, A. S., Structured Computer Organization, Second Edition, Prentice Hall, Inc. 1984, pp. 10-12.

Eric Rotenberg, James E. Smith, Control Independence in Trace Processors, Proceedings of the 32nd Annual ACM/IEEE International Symposium on Microarchitecture, p. 4-15, Nov. 16-18, 1999, Haifa, Israel .

Eric Rotenberg, Quinn Jacobson, Yiannakis Sazeides, Jim Smith, Trace Processors, Proceedings of the 30th Annual ACM/IEEE International Symposium on Microarchitecture, p. 138-148, Dec. 1-3, 1997, Research Triangle Park, North Carolina, United States.

Quinn Jacobson, Eric Rotenberg, James E. Smith, Path-Based Next Trace Prediction, Proceedings of the 30th Annual ACM/IEEE International Symposium on Microarchitecture, p. 14-23, Dec. 1-3, 1997, Research Triangle Park, North Carolina, United States.

* cited by examiner

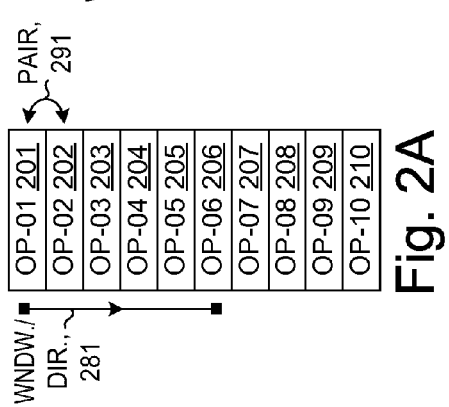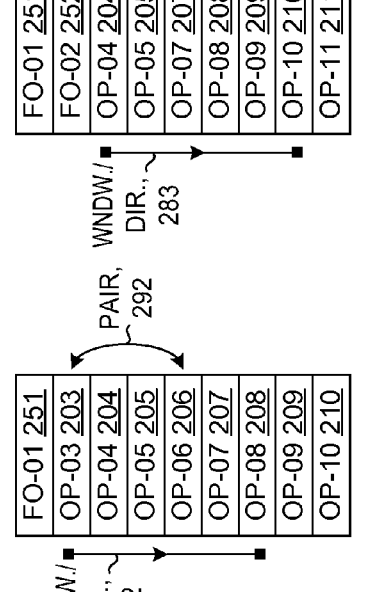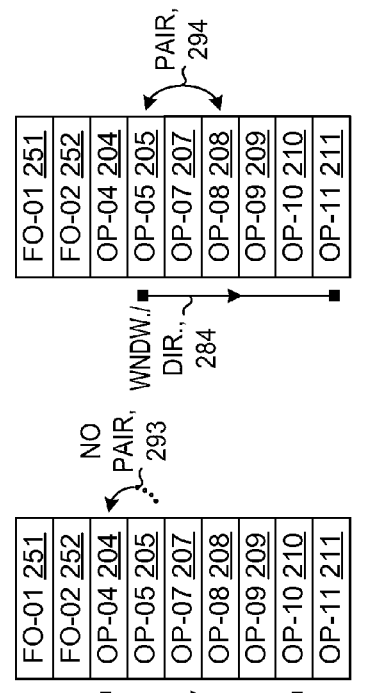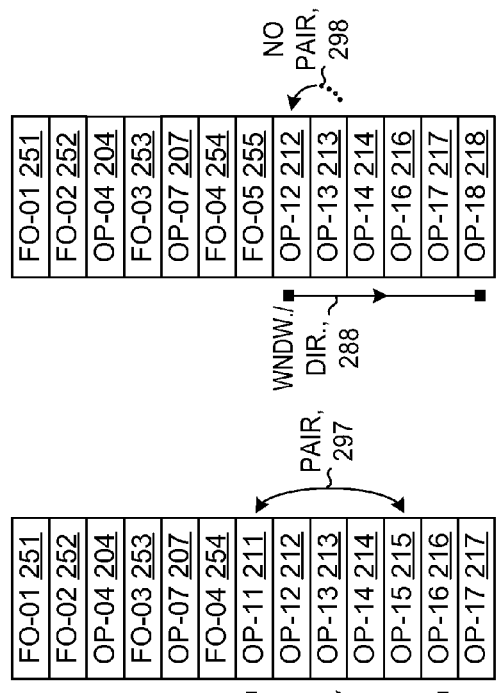

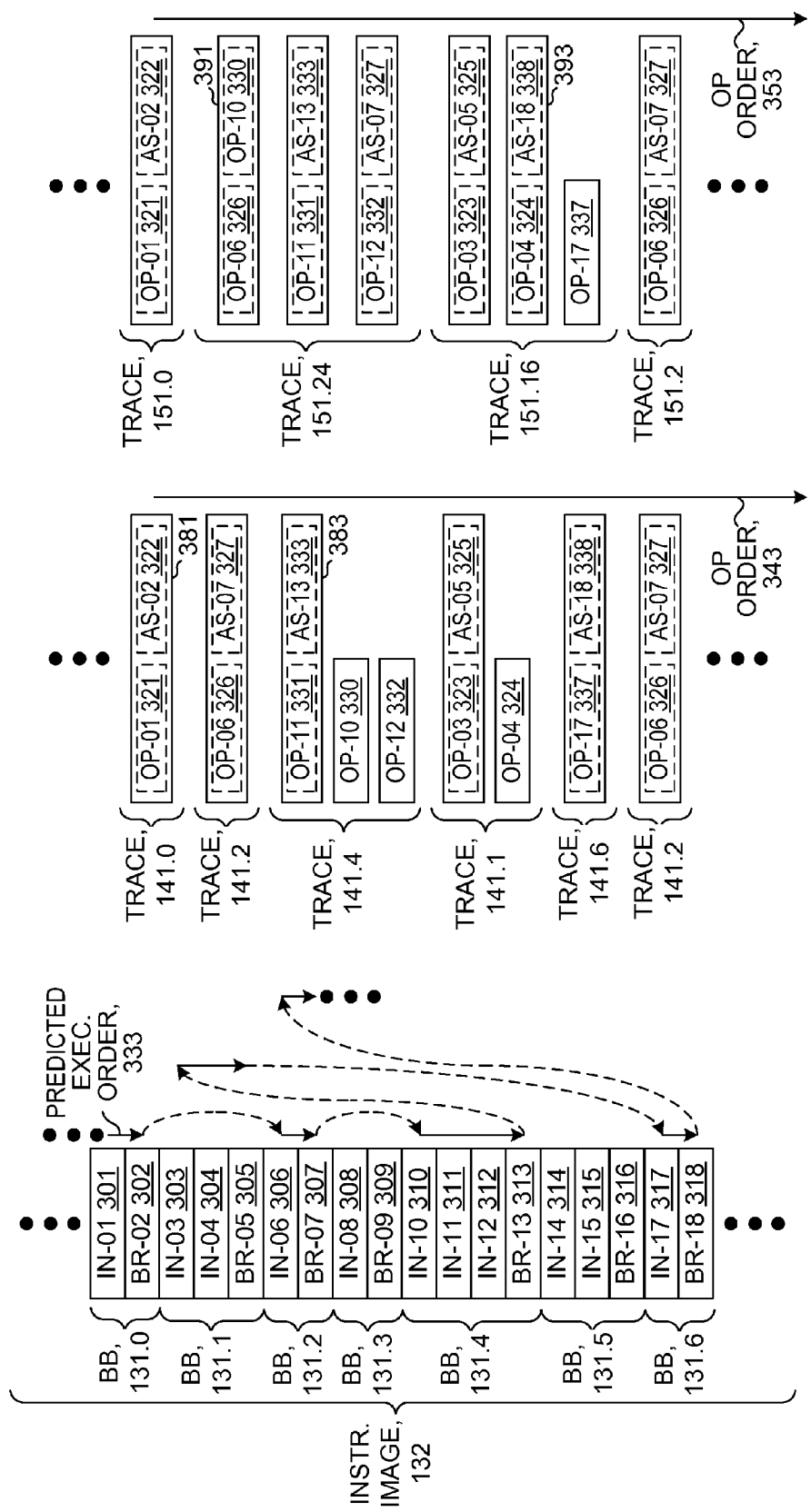

OP STREAM, 800

```
890 ~ I0: AX = LOAD [MEM_A]
891 ~ I1: AX = AX + BX
892 ~ I2: AX = AX - 3
893 ~ I3: CX = BX - CX
894 ~ I4: ASSERT Z
895 ~ I5: AX = AX + 11
896 ~ I6: AX = AX << 2
897 ~ I7: CX = CX + BASE
898 ~ I8: CX = LOAD [CX]
899 ~ I9: AX = AX + CX
```

PENDING OP RENAMING TABLE WITH STATE TRANSITIONS, 810

| | (INITIAL) 839 | POST I0 STATE 840 | POST I1 STATE 841 | POST I2 STATE 842 |
|---|---|---|---|---|
| 851~ R1 (AX) | AX | AX | AX + BX | AX + BX - 3 |
| 852~ R2 (BX) | BX | BX | BX | BX |
| 853~ R3 (CX) | CX | CX | CX | CX |
| 859~ EMIT | | LOAD R1, [MEM_A] ⌐831 | | |

| | POST I3 STATE 843 | POST I4 STATE 844 | POST I5 STATE 845 | POST I6 STATE 846 |
|---|---|---|---|---|
| 851~ R1 (AX) | AX + BX - 3 | AX + BX - 3 | AX + BX + 8 | AX |
| 852~ R2 (BX) | BX | BX | BX | BX |
| 853~ R3 (CX) | BX - CX | CX | CX | AX << 2 |
| 859~ EMIT | | SUB CX, BX, CX ‖ ASSERT Z ⌐832 | | ADD3 R1, R1, R2, 8 ⌐833 |

| | POST I7 STATE 847 | POST I8 STATE 848 | POST I9 STATE 849 | (FINAL) 850 |
|---|---|---|---|---|
| 851~ R1 (AX) | AX | AX | AX + CX | AX |
| 852~ R2 (BX) | BX | BX | BX | BX |
| 853~ R3 (CX) | AX<<2 + BASE | CX | CX | CX |
| 859~ EMIT | | LOAD R3, [R1<<2 + BASE] ⌐834 | | ADD R1, R1, R3 ⌐835 |

Fig. 8

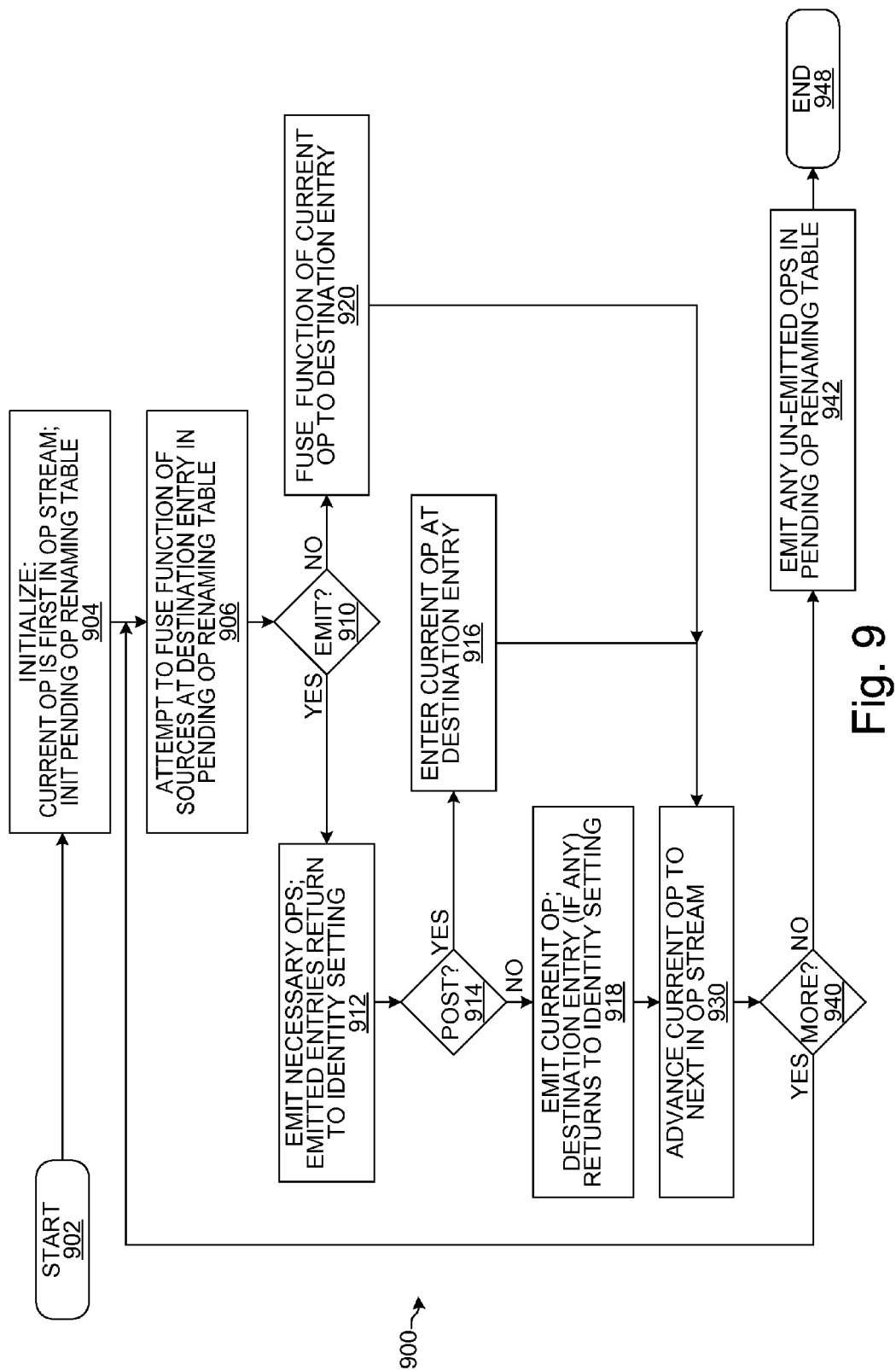

TRACE OPTIMIZATION VIA FUSING OPERATIONS OF A TARGET ARCHITECTURE OPERATION SET

CROSS REFERENCE TO RELATED APPLICATIONS

Priority benefit claims for this application are made in the accompanying Application Data Sheet (if any). To the extent permitted by the type of the instant application, this application incorporates by reference for all purposes the following application(s), which are all owned by the owner of the instant application:

U.S. Provisional Application Ser. No. 60/738,225, filed Nov. 18, 2005, first named inventor John Gregory Favor, and entitled FUSING OF REGISTER OPERATIONS, MERGING, STATUS FLAG UPDATES, BRANCHES;

U.S. Provisional Application Ser. No. 60/832,848, filed Jul. 23, 2006, and entitled MICROPROCESSOR WITH CACHES FOR INSTRUCTIONS, BASIC BLOCKS, AND TRACES;

U.S. Provisional Application Ser. No. 60/832,822, filed Jul. 23, 2006, and entitled MICROPROCESSOR WITH COHERENT CACHES FOR BASIC BLOCKS AND TRACES;

U.S. Provisional Application Ser. No. 60/866,205, filed Nov. 16, 2006, first named inventor John Gregory Favor, and entitled PROCESSOR WITH OPTIMIZED OPERATION SEQUENCES FOR BASIC BLOCK AND MULTI-BLOCK TRACE CACHES; and U.S. Provisional Application Ser. No. 60/866,203, filed Nov. 16, 2006, first named inventor Matt Ashcraft, and entitled PROCESSOR WITH BASIC BLOCK AND MULTI-BLOCK TRACE CACHES.

This application is related to the following application(s) filed simultaneously herewith and which are all owned by the owner of the instant application, and to the extent permitted by the type of the instant application, this application incorporates by reference for all purposes the following application(s):

U.S. Non-Provisional application Ser. 11/561,270 entitled FUSING OPERATIONS OF A TARGET ARCHITECTURE OPERATION SET;

U.S. Non-Provisional application Ser. No. 11/561,281 entitled FUSING REGISTER OPERATIONS OF A TARGET ARCHITECTURE OPERATION SET;

U.S. Non-Provisional application Ser. No. 11/561,284 entitled FUSING ASSERT OPERATIONS OF A TARGET ARCHITECTURE OPERATION SET; and U.S. Non-Provisional application Ser. No. 11/561,287 entitled EXECUTING FUNCTIONS DETERMINED VIA A COLLECTION OF OPERATIONS FROM TRANSLATED INSTRUCTIONS.

BACKGROUND

A processor (such as a microprocessor) processes instructions according to an architecture of the processor, the instructions having a format defined by an instruction set architecture portion of the architecture. The processing comprises fetching, decoding, and executing the instructions. Some processors directly execute instructions, whereas other processors translate instructions into internal operations (sometimes called micro-operations) and execute operations that perform an equivalent function to the instructions. In processors translating instructions, conceptually the instructions are considered to be underlying the internal operations.

Some processor architectures comprise flags (sometimes called status flags) that monitor status of results associated with some instructions, and the flags also control aspects of execution of some instructions. For example, an instruction performs an add operation, modifying a carry flag to indicate whether there was a carry out from a result. A subsequent instruction performs an add-with-carry operation that uses the carry flag as a carry input to an addition calculation. In some instruction set architectures, additional flags indicate other types of status, such as whether a calculated result is negative, zero, or positive. In some instruction set architectures, branch instructions utilize a function of zero or more flags (sometimes called a condition) to determine program flow (whether to branch to a given instruction location, or to fall through to a following instruction). Some processors implement mechanisms to provide flags for an X86-compatible instruction set architecture (for example, see U.S. Pat. No. 5,632,023 issued to White, et al.). In the X86 architecture, flags include Z (zero), C (carry), N (negative), and O (overflow). The PowerPC architecture has multiple sets of flags, each set being a field of a condition register, each set including LT (negative), GT (positive), EQ (zero), and SO (summary overflow) indications.

Some instruction set architectures (such as an X86-compatible instruction set architecture) comprise complex instructions. Some microprocessor implementations comprise translation hardware to convert instructions (including complex instructions) into sequences of one or more relatively simpler operations, referred to as micro-operations. Additionally, certain implementations store sequences of micro-operations that correspond to one or more instructions in a cache, such as a trace cache. For example, Intel's Pentium 4 microprocessor, as described by Hinton, et al (in "The Microarchitecture of the Pentium 4 Processor", Intel Technology Journal, Q1, 2001), has a trace cache.

Furthermore, it has been proposed to optimize micro-operations that correspond to a trace, such as by combining, reordering, or eliminating micro-operations. For example, see "Putting the Fill Unit to Work: Dynamic Optimizations for Trace Cache Microprocessors" by Friendly, et al, in Proceedings of the 31st Annual ACM/IEEE International Symposium on Microarchitecture, pages 173-181.

Information regarding efficient implementation of processor execution logic to support ternary operations in place of pairs of binary operations (such as "X←A op1 B op2 C" instead of Z←A op1 B; X←Z op2 C"), may be found in "Proof of correctness of high-performance 3-1 interlock collapsing ALUs", J. E. Phillips, et al., IBM Journal of Research and Development, Vol. 37, No. 1, January 1993, from http://www.research.ibm.com/journal/rd/371/ibmrd3701C.pdf. Additional information may also be found in "High Performance Execution Engines for Instruction Level Parallel Processors", by J. E. Phillips, Technical Thesis, copyright 1996, from http://ce.et.tudelft.nl/publicationfiles/17_31_thesis.ps.

All of the foregoing patents and references are hereby incorporated by reference for all purposes.

SUMMARY OF THE INVENTION

The invention, in response to inefficiencies resulting from translating instructions into operations in processors, provides for fusing of operations. In some embodiments, a method comprises translating, building, and optimizing. The translating translates instructions compatible with a reference architecture into operations compatible with a target architecture, and is carried out by a hardware translating agent within a processor. The building builds a sequence of the operations into operations of a trace. The optimizing optimizes the trace by, one or more times, selecting a collection of the operations of the trace, generating a fused operation based on the collection, and including the fused operation in the operations of the trace. In some embodiments, a system comprises a translating agent, a trace-building unit, and a fusing agent. The translating agent is adapted to operate as a component within a processor, and is enabled to translate instructions compatible with a reference architecture into operations compatible with a target architecture. The trace-building unit is enabled to build a sequence of the operations into operations of a trace. The fusing agent is enabled to optimize the trace by, one or more times, selecting a collection of the operations of the trace, generating a fused operation based on the collection, and including the fused operation in the operations of the trace. In some embodiments, a processor comprises a means for translating instructions compatible with a reference architecture into operations compatible with a target architecture, a means for building a sequence of the operations into operations of a trace, and a means for optimizing the operations of the trace. In some embodiments, a medium readable by a computer system contains descriptions that specify, when processed by the computer system, a circuit that comprises a translating agent sub-circuit, a trace-building unit sub-circuit, and a fusing agent sub-circuit. The translating agent sub-circuit is enabled to translate instructions compatible with a reference architecture into operations compatible with a target architecture. The trace-building unit sub-circuit is enabled to build a sequence of the operations into operations of a trace. The fusing agent sub-circuit is enabled to optimize the operations of the trace by, one or more times, selecting a collection of the operations of the trace, generating a fused operation based on the collection, and including the fused operation in the operations of the trace. In various embodiments, the circuit further comprises a processor, and the processor comprises the translating agent sub-circuit, the trace-building unit sub-circuit, and the fusing agent sub-circuit.

The invention is optionally embodied in various embodiments, including but not limited to one or more of a process, an article of manufacture, an apparatus, a system, a composition of matter, and a computer readable medium such as a computer readable storage medium or a computer network wherein program instructions, interpretable parameters, and hardware descriptions are sent over optical or electronic communication links.

DESCRIPTION OF THE FIGURES

FIGS. 2A-2H illustrate selected details of an example of operation fusing.

FIG. 3A illustrates selected details of an example of an instruction image comprising a plurality of basic blocks, and showing a predicted execution order of the basic blocks.

FIG. 3B illustrates selected details of an example of fusing of operations in traces of operations translated from a plurality of basic blocks in a predicted execution order.

FIG. 3C illustrates selected details of an example of fusing of operations in traces of operations translated from a plurality of basic blocks in a predicted execution order, some of the traces comprising more than one basic block.

FIG. 8 illustrates selected details of an example of operation fusing a pending operation renaming table.

FIG. 9 illustrates selected details of an embodiment of the invention as a process for fusing operations in an operation stream using a pending operation renaming table.

DETAILED DESCRIPTION OF EMBODIMENTS OF THE INVENTION

Figure 1A:
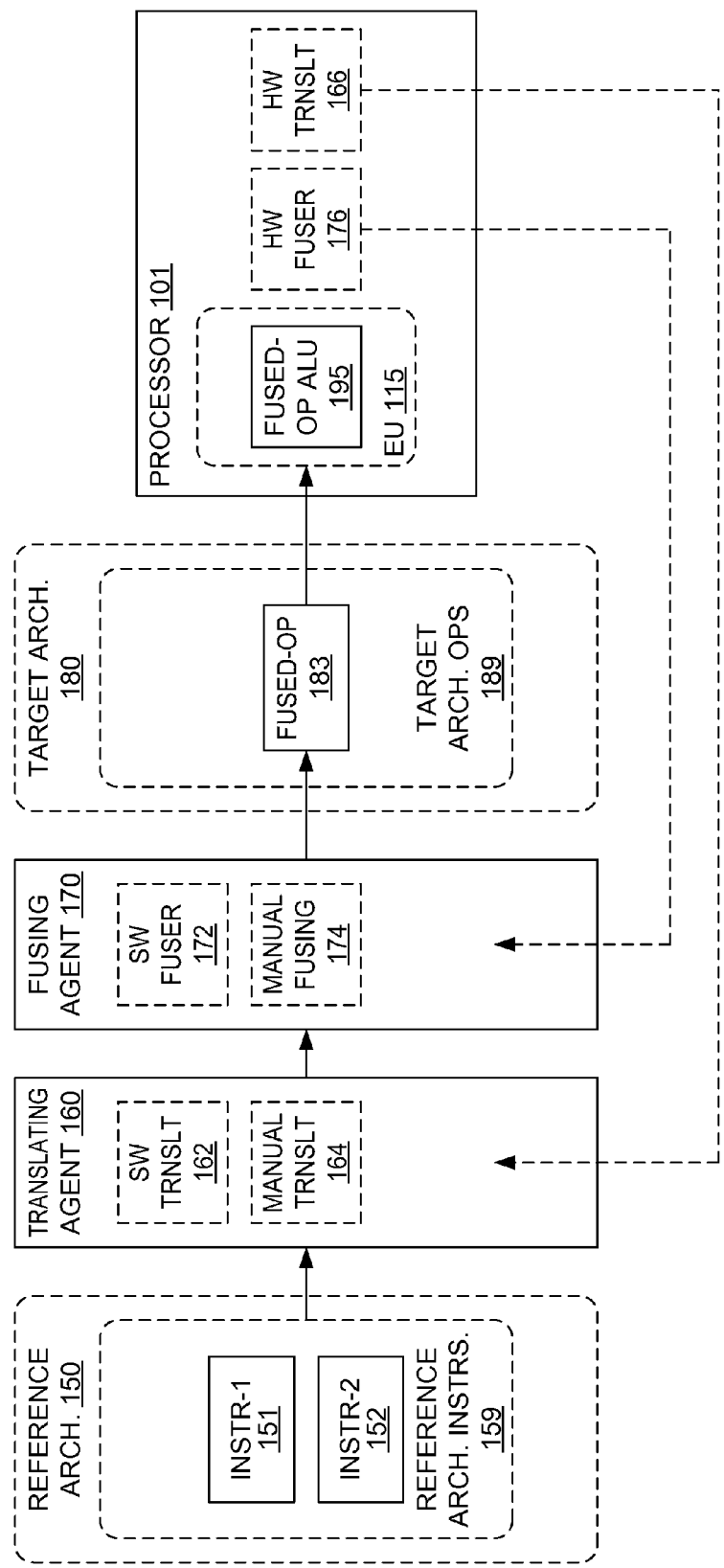
FIG. 1A illustrates selected conceptual aspects of an embodiment of the invention as a system implementing fusing of various combinations of operations, such as register operations, memory operations, merge operations, status flag updates, branches, and asserts.

A detailed description of one or more embodiments of the invention is provided below along with accompanying figures illustrating selected details of the invention. The invention is described in connection with the embodiments. It is well established that it is neither necessary, practical, nor possible to exhaustively describe every embodiment of the invention. Thus the embodiments herein are understood to be merely exemplary, the invention is expressly not limited to or by any or all of the embodiments herein, and the invention encompasses numerous alternatives, modifications and equivalents. To avoid monotony in the exposition, a variety of word labels (including but not limited to: first, last, certain, various, other, and some) may be applied to separate sets of embodiments; as used herein such labels are expressly not meant to convey quality, or any form of preference or prejudice, but merely to conveniently distinguish among the separate sets. The order of some operations of disclosed processes is alterable within the scope of the invention. Wherever multiple embodiments serve to describe variations in process, method, and/or program instruction features, other embodiments are contemplated that, in accordance with a predetermined or a dynamically determined criterion, perform static and/or dynamic selection of one of a plurality of modes of operation corresponding respectively to a plurality of the multiple embodiments. Numerous specific details are set forth in the following description to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. As is described in more detail in the Conclusion section, the invention encompasses all possible modifications and variations within the scope of the issued claims.

INTRODUCTION

This introduction is included only to facilitate the more rapid understanding of the Detailed Description. The invention is not limited to the concepts described in the introduction, as the paragraphs of any introduction are necessarily an abridged view of the entire subject and are not meant to be an exhaustive or restrictive description. For example, the introduction that follows provides overview information limited by space and organization to only some embodiments. There are in fact many other embodiments, including those to which claims will ultimately be drawn, that are described throughout the balance of the specification.

Terms

Elsewhere herein various terms are used with respect to descriptions of embodiments. Examples of some of the terms follow.

An architecture of a processor can be thought of as a programmer's view of the observable and/or controllable state of the processor, as well as a manner to modify (i.e., to write or to update) the state. An instruction set architecture is a portion of the architecture of the processor that defines the semantics and format of instructions executed by the architecture to carry out computations, and/or to change architected state of the processor. In some situations, an architecture has no direct physical implementation in the sense that some architectures are virtual, and some or all of state of the processor and/or manner to control the processor are mapped to a second architecture of a different processor. As used herein for purposes of example, a reference architecture (reference instruction set architecture) generally refers to an architecture that is, at least in part, virtual, and a target architecture (target instruction set architecture) generally refers to an architecture that has a direct physical implementation. These terms should not be considered limiting, and embodiments herein that describe translating from a reference architecture to a target architecture are operable independent of, for example, whether the target architecture is virtual or has a complete physical implementation.

The terms instruction and operation are used somewhat interchangeably to denote a unit of processing and/or computation on a processor. An instruction (or operation) is a command in a format proscribed by an instruction set architecture of the processor for performing a processing act or a portion of a computation, such as adding or subtracting, or setting or checking a status flag, or modifying processor state, or branching to a different location in a sequence of instructions (or operations). As used herein, instruction is generally used with respect to a reference instruction set architecture (reference architecture), and operation is generally used with respect to a target instruction set architecture (target architecture). For example, a description of translating an instruction into one or more operations, without specific mention of any architecture or architectures, implies a translation from an instruction compatible with a reference architecture to one or more operations compatible with a target architecture.

Instructions compatible with a reference architecture forming some or all of a program are sometimes translated into operations compatible with a target architecture, the translation preserving the observable functionality of the instructions (such as changes to architected state as defined by the reference architecture). The term observable functionality is intended to refer to any and all effects of execution, such as changes of architectural state that are relied upon, either directly or indirectly, by further correct execution of the program. Similarly, with respect to architectural state specified to be changed by an instruction, the term observable state refers to a subset of the architectural state specified to be changed by the instruction that corresponds to the observable functionality of the instruction.

In some embodiments, when instructions compatible with a reference architecture are translated into operations compatible with a target architecture, references to architectural state of the reference architecture are also translated. For simplicity of exposition, architectural state, such as registers or status flags, is sometimes described as if the state were present equivalently in both the reference architecture and the target architecture. In some embodiments, the representation of the reference architectural state in the target architecture is identical in size and/or in form to the reference architecture, while in other embodiments the representation is different in size and/or form. In some embodiments, the architectural state in the target architecture (when interpreted as the reference architectural state, and as observed and modified by operations of a translated program) appears to undergo changes equivalent to changes to the reference architectural state from execution of the (untranslated) program on a processor capable of directly executing the reference architecture. In some embodiments, a location of architectural state of a target architecture equivalent to architectural state of a reference architecture varies dynamically in some circumstances. For example, in a target architecture employing some types of register renaming, prior to execution and commitment of an operation specifying modification of a reference architecture register, a first target architecture register is equivalent to the reference architecture register, and subsequent to the execution and commitment, a second target architecture register is equivalent to the reference architecture register.

The term instruction image refers to a sequence of instructions, such as instructions forming all or a portion of a program, to be executed by a processor. An instruction image comprises a sequence of basic blocks, each, basic block comprising a sequence of instructions, optionally ending with a branch instruction, and with no internal branch instructions. In some usage scenarios, one or more instruction images are represented by one or more portions of object code.

The term instruction stream refers to a sequence of instructions from an instruction image in program order, the program order differing from a sequential order of instructions in the instruction image due to execution of branch instructions. In some usage scenarios, an instruction image is a spatial sequence of instructions, whereas an instruction stream is a temporal sequence of instructions. An instruction stream can be represented as a sequence of basic blocks from an instruction image in program (temporal) order, the program order differing from a sequential (spatial) order of basic blocks in the instruction image due to execution of branch instructions as the final instruction in one or more basic blocks. In some embodiments one or more of the branch instructions are explicitly represented in the instruction image. In some embodiments one or more of the branch instructions arise implicitly due to an exception detected during execution of the program (such as an asynchronous external interrupt or a synchronous exception from an instruction of the program). In some embodiments one or more of the branch instructions are implicitly represented in the instruction image. For example, in some embodiments, certain complex instructions translate into a sequence of operations including a branch operation.

The term predicted execution order refers to a prediction of the program order based on predictions of directions taken by branch instructions, and, in some usage scenarios and/or embodiments, a predicted lack of exceptions. Predicted execution order is used both to refer to an order of basic blocks in a predicted program order, and to refer to an order of instructions (or operations) among multiple basic blocks, the basic blocks in a predicted program order, the instructions (or operations) in each of the basic blocks in a sequential order. In some embodiments, a speculative execution order, referring to an order in which instructions or operations are scheduled and/or issued in a processor pipeline, differs from a predicted execution order due, for example, to out-of-order issue of instructions or operations.

An example of a trace is a finite sequence of instructions or operations corresponding to dynamically consecutive (according to program execution order) instructions. An example of an atomic trace is a trace that is treated, in its entirety, as a single indivisible operation or as having a single entry and a single exit (i.e. the trace is completed in full or not at all). In some embodiments atomic traces are produced by hardware translation of sequences of instructions used by software according to a reference architecture (such as the PowerPC architecture, an X86-compatible architecture, or any other similar, standardized, processor architecture). In some usage scenarios an atomic trace corresponds to instructions from more than one basic block, i.e. has one or more interior conditional branches. As a degenerate case, in some usage scenarios, an atomic trace corresponds to a single instruction. In some usage scenarios speculative execution restore points correspond to atomic trace boundaries. See FIG. 3 and the associated description for selected details of an embodiment of building traces from basic blocks.

In some embodiments, register instructions are translated into register operations. In some embodiments, register operations are fused so as to combine the functionality of multiple instructions into a single operation. In some usage scenarios, register instructions or operations, unlike branch instructions or operations, do not change control flow. In some usage scenarios, register instructions or operations, unlike memory instructions or operations, do not read and/or write a main memory. In various embodiments, register instructions or operations comprise instructions or operations that read and/or that write general-purpose architectural register state. In various embodiments, register instructions or operations comprise instructions or operations that read and/or that write special-purpose architectural register state. In some embodiments, a register instruction or operation specifies an arithmetic function, such as computed by an Arithmetic Logic Unit (ALU), to be performed on contents of one or more source registers, producing a result. In some embodiments, the result is written to one or more destination registers. In some embodiments, a register instruction or operation has side effects, such as setting architectural flag state based, at least in part, upon the result.

In some embodiments, memory instructions are translated into memory operations. In some embodiments, register and memory operations are fused so as to combine the functionality of multiple instructions into a single operation. In some usage scenarios, memory instructions or operations, unlike branch instructions or operations, do not change control flow. In some usage scenarios memory instructions or operations read and/or write a main memory. In some usage scenarios memory instructions or operations read and/or write a special-purpose memory. In various embodiments, memory instructions or operations comprise instructions or operations that read and/or that write general-purpose architectural register state. In various embodiments, memory instructions or operations comprise instructions or operations that read and/or that write special-purpose architectural register state. In some embodiments, a memory instruction or operation specifies an address arithmetic function, such as computed by an Arithmetic Logic Unit (ALU), to be performed on contents of one or more source registers, producing an address. In some embodiments, a result of a memory instruction or operation, such as a load instruction or operation reading memory at an address, is written to one or more destination registers. In some embodiments, execution of a memory instruction or operation, such as a store instruction or operation writing memory at an address, writes a general-purpose architectural register state or a special-purpose architectural register state to a memory, such as a main memory.

In some embodiments, branch instructions are translated into branch operations. In some embodiments, branch instructions are translated into assert operations. In some embodiments, branch instructions comprise loop instructions. In some embodiments, a loop instruction is translated into a plurality of operations comprising a register operation and a branch operation. In some embodiments, a loop instruction is translated into a plurality of operations comprising a register operation and an assert operation. An assert operation is semantically distinguished from a branch instruction or a branch operation. A branch instruction (or operation) has semantics of performing a (possibly conditional) program order control-flow transfer to a location specified at least in part by the branch instruction (or operation). A conditional branch instruction (or operation) has semantics of evaluating a condition, such as a flag value, and conditionally performing a branch. An assert operation, on the other hand, has semantics of evaluating a condition, and conditionally canceling and/or aborting a trace (rather than causing a program order control-flow transfer). Because an assert operation is not associated with a program order control-flow transfer, in some usage scenarios, an assert operation is (re)located anywhere within a trace, other than for constraints due to dependencies (such as needing prior computation of a value of any flags used by the assert operation).

The word "set", in the sense of changing a state, is synonymous with the word produce. For example, in some embodiments, various instructions specify setting (producing) flag state. Similarly, the word use is synonymous with the word consume. For example, in some embodiments, various instructions specify using (consuming) flag state.

Overview

In some embodiments, a processor directly executes an instruction stream, while in other embodiments a processor translates instructions compatible with a reference architecture into operations compatible with a target architecture, the operations being directly executable by the processor. In some embodiments and/or usage scenarios, fusing collections of operations into fused operations enables more efficient use of the processor. In some embodiments and/or usage scenarios, translating a branch instruction into an assert operation, and fusing the assert operation with another operation, enables advantageous processing of an operation stream.

In some embodiments, sequences of operations in a predicted execution order form traces. Fusing a register operation and a branch operation in a trace forms a fused reg-op/branch operation. Fusing of operations translated from flag-setting instructions requires setting only a final flag state; intermediate flag state is optionally used implicitly in a fused operation, but is not saved. Fused operations need only set architectural state, such as portions of registers, that is subsequently read before it is subsequently written.

In some embodiments, an instruction image to be executed by a processor comprises instructions compatible with a reference architecture In some embodiments, a processor translates instructions from the instruction image into operations compatible with a target architecture, the operations having equivalent observable functionality, and executes the operations rather than the original instructions. In some embodiments, the operations are optimized prior to being executed, and/or are dynamically optimized during execution.

In some embodiments, instructions are translated into operations, operations are grouped into basic blocks, and basic blocks are grouped into traces. In some embodiments, optimization of operations occurs over the span of a single trace. In some embodiments, optimization of operations occurs over the span of a single basic block. In some embodiments, optimization of operations spans basic block boundaries, such as when a trace comprises a plurality of basic blocks.

In some embodiments, optimization of operations comprises fusing operations. In some processors, an Arithmetic Logical Unit (ALU) is capable of performing three-input operations, and some operations of the processor architecture use all three inputs. For example, instructions compatible with a reference architecture specify only two-input ALU functions; translating each instruction to an equivalent operation does not fully utilize a three-input ALU. Fusing two or more two-input operations into a fused operation, however, can fully utilize a three-input ALU. The fused operations advantageously reduce size of translated code, and execute more efficiently in some usage scenarios and/or embodiments.

In some embodiments, optimization of an operation, including any un-fused or fused operation, is done by reducing an amount of architectural state modified by the operation. In some embodiments, an operation need only set observable architectural state, even though an architectural definition of the operation specifies a larger amount of architectural state modifications. For example, consider an operation defined architecturally to modify a particular portion of architectural state. If a subsequently executed operation also modifies the particular portion of architectural state, and no intervening operation reads or otherwise relies on the particular portion of architectural state, then the modification of the particular portion of architectural state is not considered to be observable functionality. Thus, execution of the operation is optimized, in some embodiments, by not modifying the particular portion of architectural state. In some embodiments, a determination of observable functionality is made as part of translating and/or fusing operations, and resultant translated and/or fused operations are chosen to advantageously modify only observable architectural state.

Translating Instructions

In some embodiments, instructions compatible with a reference architecture are translated into operations compatible with a target architecture. In some embodiments, a translation has identical functionality. In some embodiments, a translation has equivalent observable functionality.

In some embodiments, a branch instruction is translated into an assert operation, which tests if a condition has a predicted value. In some embodiments, a condition is a function of the values of a specified group of status flags. In some embodiments, an operation placed subsequent to an assert operation in an operation stream is chosen based upon both a predicted value of a condition and a path a branch instruction, from which the assert operation was translated, would take given the predicted value.

In some embodiments, a basic block, containing at least a first instruction and a subsequent branch instruction, is translated into a portion of an operation stream; an assert operation translated from the branch instruction is moved prior to a translation of the first instruction in the operation stream.

In some embodiments, an instruction image is translated as a whole. In some embodiments, instructions from an instruction image are translated dynamically in program order (i.e., as an instruction stream) as the translated instructions are executed. In some embodiments using dynamic translation of instructions, sequences of instructions in a predicted execution order are organized as traces, and traces are translated and/or optimized as a unit. In some embodiments, translations of instructions organized as traces are saved in a trace cache for repeated execution. In some embodiments, optimizations applied to a trace depend upon a frequency of execution of the trace. In some embodiments, trace boundaries are changed during execution, such as when a predicted execution order is incorrect.

In various embodiments, translation of instructions into operations is performed using one or more combinations of the following techniques:

Hand (or manual) translation of instructions into operations (as illustrated by Manual Translation 164, as shown in FIG. 1A);

Software translation of instructions into operations (as illustrated by Software Translator 162, as shown in FIG. 1A); and Hardware translation of instructions into operations (as illustrated by Hardware Translator 166, as shown in FIG. 1A).

Fusing Operations

In some embodiments, a fusing agent examines a source operation stream (such as provided by translating an instruction stream), determines suitable collections of two or more operations, and generates corresponding fused operations for each suitable collection. Fused operations and operations that are not suitable for fusing are output to a destination operation stream. Each of the generated (fused) operations is any combination of or fewer in number than the corresponding source operations. One or more of the fused operations specify less expensive processing than the corresponding source operations, or enable parallel computation of otherwise serial results, according to various embodiments and usage scenarios. In some embodiments a fused operation implicitly passes an intermediate result from a first portion of the fused operation to a second portion of the fused operation. In some embodiments a fused operation conceptually passes an intermediate result from a first portion of the fused operation to a second portion of the fused operation, though the intermediate result is not present in a readily apparent form, such as by being on specific signal lines, when the fused operation is executed.

In some usage scenarios the source operation stream comprises operations such as X=B op1 C and A=X op2 D, providing an opportunity for generation of a fused operation such as A=B op1 C op2 D to a destination operation stream. No intermediate value (such as X) is produced during execution of the fused operation. If the intermediate value is referenced by later operations, then either a calculation of the intermediate value is fused into the later operation (such as F=B op1 C op3 E), or the original operation calculating the intermediate value is retained in the destination operation stream after fusing (such as keeping X=B op1 C). Even when the original operation calculating the intermediate value appears in the destination operation stream, the original operation is executable in parallel, in some usage scenarios, with the fused operation, thus enabling faster execution (by shortening a potential critical path) than the source operation stream.

Recognition of opportunities for fused operation generation, and creation of fused operations are performed, according to various embodiments, using any combination of the following techniques:

Hand (or manual) coding of instructions for an architecture that supports fused instructions (as illustrated by Manual Fusing 174, as shown in FIG. 1A);

Software compilation of high-level code to an architecture that supports fused instructions (as illustrated by Software Fuser 172, as shown in FIG. 1A);

Software translation of instructions for an architecture into operations for a different architecture that supports fused operations (as illustrated by Software Fuser 172, as shown in FIG. 1A); and Hardware translation of instructions for an architecture into operations for a different architecture that supports fused operations (as illustrated by Hardware Fuser 176, as shown in FIG. 1A).

In some embodiments fusing is not limited to arithmetic and logical operations, such as in usage contexts relating to software and/or hardware translations of instructions compatible with a reference architecture into operations compatible with a target architecture. According to various embodiments, fusing is performed with respect to target architecture operations relating to merging, updating status flags, branching, and/or asserting.

In some embodiments, a target architecture operation set includes opcodes specifying fused operation functionality. For example, in various embodiments, a collection of operations is fusible if there is an opcode having the combined functionality of the operations. In some embodiments, an opcode field of an operation specifies a function performed by the operation, and both un-fused and fused operations utilize the opcode field to specify a performed function.

In some embodiments, a target architecture operation set includes operations specifying two source operands. In some embodiments, a target architecture operation set includes operations specifying three source operands. In various embodiments, source operands comprise registers and constants. In some usage scenarios, two operations that each use less than three source operands are fused into a single operation using three source operands.

In some embodiments, a target architecture operation set includes operations specifying a plurality of opcodes collectively defining fused operation functionality (e.g. each opcode defines at least in part the functionality of a fused operation). In some embodiments, a target architecture operation set includes operations specifying a plurality of opcodes (collectively defining fused operation functionality) that each refer to a plurality of sources specified by the operations.

Fusing and Merging

In some embodiments, a reference architecture defines instructions that write only a partial result (e.g. only 16 bits are written to a 32-bit register); an unwritten portion of a register is architecturally defined to retain a previous value. Depending on hardware included to execute a target architecture (e.g. if register renaming is used), writing a partial result requires, in some embodiments, an explicit operation to merge a new, partial value with an old, register value. In some implementations with a reference architecture that specifies writing partial results to registers, a target architecture defines fused instructions that perform a merge as a final operation (such as A=B op C merge old_A). In some embodiments, the merge adds very little time to instruction execution, and the target architecture provides for fusing of two operations in addition to merging (such as A=B op1 C op2 D merge old_A).

In some usage scenarios where merging of partial results is always desired, merging is implicit in the target architecture. However, there may be cases where merging is not useful, or is even counterproductive. For example, when a merged result is not needed by software, filling a remaining portion of a register with zeros, or leaving a remaining portion of a register as is, may be more advantageous (i.e. have better performance or lower power consumption) than merging with an old register value. The choice of merging, zero extension, or leaving unchanged is explicit in some embodiments of a target architecture (e.g. with opcode bits), while in other embodiments the choice is implicitly based on other aspects of a computation. The other aspects of the computation optionally comprise architectural observability of results. For example, in some embodiments, partial writes to registers visible in a reference architecture are merged, while partial writes to registers visible only within a target architecture (and thus not observable in a reference architecture) are zero extended.

State-Based Optimizations

In some embodiments, translating and/or fusing optionally perform additional state-based optimizations taking advantage of unobservable architectural state modifications. For example, a first instruction writes a lower 16 bits of a 32-bit register, and an immediately following (in predicted execution order) instruction reads only the lower 16 bits of the register, and writes all 32 bits of the register; an effect of the first instruction on an upper 16 bits of the register is not observable, since the following instruction over-writes the upper 16 bits (without any intervening read of the upper 16 bits). In a translation of this pair of instructions into operations, even if the effect of the first instruction on the upper 16 bits of the register is architecturally defined in a reference architecture of the instructions, a translation of the first instruction into one or more operations compatible with a target architecture would not have to perform a functionally equivalent operation on the upper 16 bits of the (translated) register, since a value of the upper 16 bits as a result of the first instruction is immaterial to any result of the pair of instructions.

In addition to updating a register value to indicate a result of an instruction, instructions of some architectures also update one or more status flags. In some embodiments of a target architecture, status flags are renamed or managed by hardware to support speculative and/or out-of-order execution. In some embodiments, to reduce hardware and/or power, a translation to a target architecture disables some or all flag updates when not needed (e.g. when an updated status flag would not be used before a next update). Thus, in some embodiments, in the target architecture, an operation (or fused operation) is enabled to selectively produce one or more status flags when executed.

In some embodiments, state-based optimizations are performed within a trace. In some embodiments, state-based optimizations are not performed across trace boundaries. In some embodiments and/or usage scenarios, a last update in a trace, of a portion of architectural state, is considered to be "live out" of the trace since no further operations in the trace update the portion of architectural state. Since it is not known whether the portion of architectural state is next read or next written by an operation in a subsequent trace, it is assumed that the portion of architectural state is next read and the portion of architectural state is materialized before the end of the trace.

In some embodiments, an operation to calculate a register value is fused with a branch operation to form a fused reg-op/branch operation. In some embodiments, an operation to calculate a register value is fused with an assert operation to form a fused assert operation. In some architectures, a branch operation checks a condition (such as a function of one or more flag values), and, depending on the result, either continues execution sequentially or branches to a specified next instruction. In some architectures, an assert operation tests a condition (such as a function of one or more flag values) to determine if the condition is a predicted value. In some usage scenarios, a sequence of operations (including assert operations) corresponds to a predicted execution order of one or more basic blocks. Thus if any of the assert operations fail, execution of the sequence is aborted and a different sequence having a corrected predicted execution order is executed.

Conditions for branch operations and assert operations are checked based on status flags, such as produced by flag-setting operations. If status flag production is optional (as described above), then the conditions are checked based on values for status flags that would have been produced if status flag production were enabled. In other words, status flags are conceptually produced for internal use by a fused operation, but the status flags are only optionally recorded for future use (i.e. used to update status flag architectural state).

If a particular register value computation is defined to leave some subset of status flags unchanged (and so an optional flag production setting has no effect for the unchanged status flags), then a fused branch or assert operation checks the unchanged status flags, using the last value produced, corresponding to the subset.

System

FIG. 1A illustrates selected conceptual aspects of an embodiment of the invention as a system implementing fusing of various combinations of operations, such as register operations, memory operations, merge operations, status flag updates, branches, and asserts. Reference Architecture 150 defines various instructions, such as Instr-1 151 and Instr-2 152, and Target Architecture 180 defines various operations, such as Fused-op 183. Target architecture operations are executed by processor 101.

Translating Agent 160, in some embodiments, translates instructions of the reference architecture into operations of the target architecture. An instruction of the reference architecture to be translated is processed by the translating agent into zero or more operations of the target architecture, the operations having equivalent observable functionality to the instruction. The translating agent optionally performs other transformations, such as optimizing state-setting of the operations. The translating agent according to various embodiments, comprises software (such as Software Translator 162), comprises manual actions performed by humans (such as Manual Translator 164), comprises hardware (such as Hardware Translator 166 included in the processor), or comprises any combination of the foregoing. In various embodiments, a trace unit of the processor comprises Hardware Translator 166. In various embodiments, Hardware Translator 166 is contained within a core of the processor.

For example, in some embodiments, where the reference architecture and the target architecture are substantially the same, or where the reference architecture is substantially a subset of the target architecture, instructions compatible with a reference architecture are directly input (without, or with minimal, translation) to Fusing Agent 170. In various embodiments, instructions compatible with a reference architecture are first translated by a translating agent, such as Translating Agent 160, before being input to Fusing Agent 170.

In some embodiments, Fusing Agent 170 transforms selected collections of operations of the target architecture into equivalent fused operations of the target architecture. In various embodiments, the fused operations are executed by Processor 101 via Execution Unit 115 containing Fused-op ALU 195. In various embodiments, Fused-op ALU 195 is a three-input ALU. In various embodiments, Fused-op ALU 195 is capable of performing the equivalent function of multiple two-input operations.

Fusing Agent 170 optionally performs other transformations, such as optimizing state-setting of the operations. The fusing agent according to various embodiments, comprises software (such as Software Fuser 172), comprises manual actions performed by humans (such as Manual Fusing 174), comprises hardware (such as Hardware Fuser 176 included in the processor), or comprises any combination of the foregoing. In various embodiments, a trace unit of the processor comprises Hardware Fuser 176. In various embodiments, Hardware Fuser 176 is contained within a core of the processor.

In various embodiments, Translating Agent 160 and Fusing Agent 170 are embodied in different manners. For example, in some embodiments, the translating agent is software such as Software Translator 162, and the fusing agent is hardware such as Hardware Fuser 176. In some embodiments, Translating Agent 160 and Fusing Agent 170 are combined so that translating and fusing are performed by a single agent.

Figure 1B:
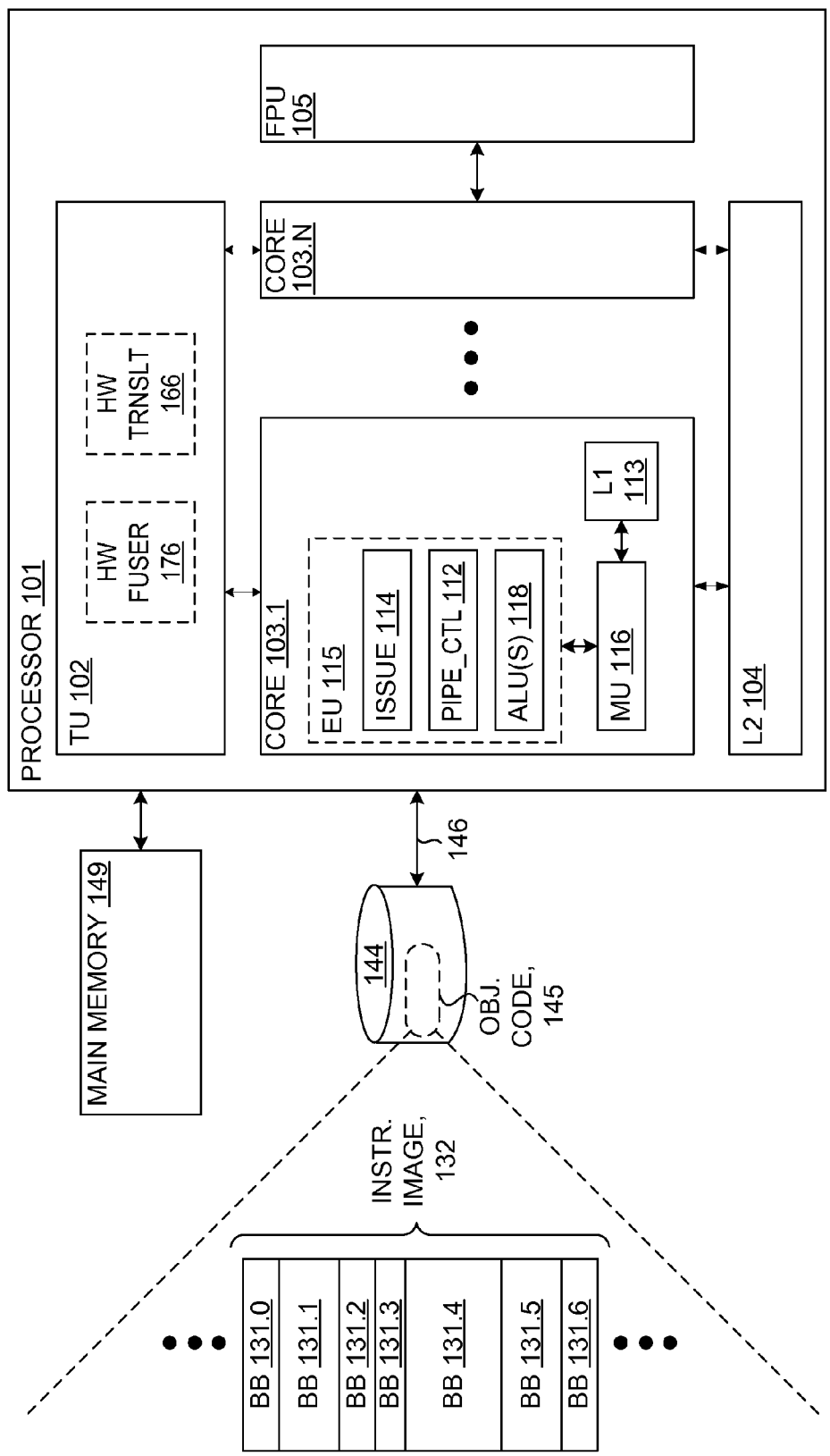
FIG. 1B illustrates selected details of an embodiment of the invention as a computer processing system using operation fusing.

FIG. 1B illustrates selected details of an embodiment of the invention as a computer processing system using operation fusing. Processor 101 comprises Trace Unit (TU) 102, Cores 103.1 to 103.N, Floating Point Unit (FPU) 105, and Level 2 Cache (L2) 104. Trace Unit 102 supplies traces of operations to the cores. In some embodiments, Trace Unit 102 fetches instructions for the cores, translates the instructions into operations, and provides the translated instructions as traces to the cores. In some embodiments, Trace Unit 102 comprises a hardware translator, such as hardware Translator 166, to translate instructions into operations. In some embodiments, Trace Unit 102 comprises a hardware fuser, such as hardware Fuser 176, to optimize selected collections of operations. In some embodiments, Trace Unit 102 optimizes the operations in other manners, such as by optimizing state-setting of operations. In some embodiments, Trace Unit 102 comprises one or more trace caches storing translated versions of instructions. In various embodiments, Trace Unit 102 provides traces to the cores as a sequence of operations, each operation paired with a Trace ID. In various embodiments, Trace Unit 102 is enabled to provide more than one operation to a single core in a single clock cycle.

Each of Cores 103.1 to 103.N comprises respective execution and memory units, as illustrated by Execution Unit (EU) 115 and Memory Unit (MU) 116 included in Core 103.1. In various embodiments, Execution Unit 115 controls issuing and execution of operations in the core. Execution Unit 115 comprises Issue Unit 114, Pipeline Control 112, and ALU(s) 118. In some embodiments, Issue Unit 114 receives operations from Trace Unit 102, and performs operation scheduling, operation issue, and related tasks such as register renaming In some embodiments, pipeline control 112 comprises logic to checkpoint traces, and logic to commit and/or to control traces. ALUs 118 represents one or more processing units, such as an integer unit. In various embodiments, ALUs 118 comprises a fused-op ALU, such as Fused-op ALU 195, as shown in FIG. 1A. Memory Unit (MU) 116 represents one or more memory units to process all or portions of memory referencing operations. Memory Unit 116 is coupled to a Level 1 Cache (L1) 113.

The cores are coupled to the TU and to the L2. In various embodiments, only a portion of the cores are coupled to the FPU (as shown with respect to Core 103.N). In various embodiments, all of the cores are coupled to the FPU (not illustrated in FIG. 1B). In some embodiments, the cores are identical, while in other embodiments some of the cores are of one type (having, for example, relatively high instruction processing bandwidth and capable of operating at a relatively high frequency), and some of the cores are of another type (having relatively low processing bandwidth and frequency). The number and processing capabilities of the cores are varied without restriction, according to various embodiments.

In some usage scenarios, an external storage device, such as disk 144, as shown in FIG. 1B, is coupled to processor 101 by input/output (I/O) connection 146 to provide storage for programs such as object code 145, and optionally for data (not explicitly shown in FIG. 1B). Object code 145 comprises a sequence of instructions, shown as instruction image 132. In various embodiments, instruction image 132 is treated as a sequence of basic blocks ( . . . , 131.0-131.6, . . . ) by Trace Unit 102.

Processor 101, in various embodiments, is coupled to an external memory system, such as main memory 149. In some embodiments, main memory 149 comprises one or more external memory devices such as Dynamic Random Access Memory (DRAM), Static Random Access Memory (SRAM), or non-volatile memory. In some embodiments, main memory 149 comprises different types of memory devices and/or memory control devices. In various embodiments, main memory 149 comprises all or portions of a cache memory or hierarchy, and/or operates in conjunction with all or portions of a cache memory or hierarchy within processor 101. In some usage scenarios, instruction image 132 is stored on an external storage device, such as disk 144, and all or portions of instruction image 132 is copied to main memory 149 to provide more efficient access during execution of instructions of the instruction image.

In some embodiments, various combinations of all or portions of functions performed by a translating agent (such as Hardware Translator 166), a fusing agent (such as Hardware Fuser 176), and portions of a processor (such as processor 101) are specified by descriptions compatible with processing by a computer system (e.g. Verilog, VHDL, or any similar hardware description language). In various embodiments the processing comprises any combination of interpretation, compilation, simulation, and synthesis to produce, to verify, or to specify logic suitable for inclusion on an integrated circuit.

Example of Operation Fusing

FIGS. 2A-2H illustrate selected details of an example of fusing of operations of a target architecture. In FIGS. 2A-2H, an input sequence of operations (OP-01 201 through OP-18 218) is processed in-place into an output sequence of operations, replacing selected pairs of operations with fused operations (FO-01 251 through FO-05 255). In some embodiments, the input sequence of operations is a translated version of a sequence of instructions. In some embodiments, the input sequence of operations is in a predicted execution order. In some embodiments, the input sequence of operations comprises one or more basic blocks. In various embodiments, a trace comprises the input sequence of operations.

FIG. 2A shows an initial portion of the sequence of operations (OP-01 201 through OP-10 210). FIGS. 2B-2H show successive versions of a portion of the sequence of operations as decisions are made to fuse or not to fuse pairs of operations. Each of FIGS. 2A-2H shows a search window (281 through 288) and a pairing (or lack thereof) decision (291 through 298). A successful pairing decision (e.g., pair 291), converts the paired operations into a fused operation. For example, pair 291 comprising OP-01 201 and OP-02 202, as shown in FIG. 2A, is converted into fused operation FO-01 251, as shown in FIG. 2B. An unsuccessful pairing decision (e.g., no pair 293), outputs an operation as is without fusing. For example, no pair 293, as shown in FIG. 2C, fails to find a suitable operation to pair with operation OP-04 204, and operation OP-04 204 is output unchanged (as shown in FIG. 2D).

As shown in FIGS. 2A-2H for search windows 281 through 288, in some embodiments, a search window is associated with a direction of search. In various embodiments, a search is done independent of direction or considers all directions. In some embodiments, as shown in FIGS. 2A-2H, a search attempts to find a second operation to pair with a first operation in a search window. In other embodiments, a search tries to find a pair of operations in a search window using other criteria, such as searching in a reverse direction (where a last operation in the search window is one of the operations in the pair), or searching for a best pair within the search window. In various embodiments, a search window is a fixed size. In various embodiments, the window is a variable size. In various embodiments, a search window spans from a current operation until a last operation of a trace. In some embodiments, a search window spans, in a reverse direction, from a current operation until a first operation of a trace. In some embodiments, a search terminates when an entire search window has been checked. In some embodiments, a search terminates when a first pair is found. In some embodiments, a search terminates after a fixed amount of time, or a fixed number of cycles or computations have been expended on the search. In some embodiments, a search window moves as searches complete. In various embodiments, a search window moves when there are no more pairs found within the search window. In various embodiments, the search window is stationary during the search.

While FIGS. 2A-2H show examples of fusing of pairs of operations, in some embodiments, collections of operations are fused, where a collection comprises two or more operations. In some embodiments, a collection of operations to be fused is searched for in accordance with the examples of FIGS. 2A-2H with respect to pairs of operations.

Criteria for determining that a collection of operations can be fused are based, at least in part, upon details of the target architecture. In general, a collection of operations can be fused when the target architecture supports a single operation having a same observable functionality as the collection of operations. In some embodiments, determining that a collection of operations is fusible considers only the operations in the collection. In various embodiments, determining that a collection of operations is fusible considers both the operations in the collection and other operations, to determine the observable functionality modified by the collection of operations.

Examples of Operation Fusing in a Trace

FIG. 3A illustrates selected details of an example of an instruction image comprising a plurality of basic blocks, and showing a predicted execution order of the basic blocks. Instruction image 132 comprises basic blocks 131.0 through 131.6, and possibly other basic blocks not shown in FIG. 3A. Predicted execution order 333 shows how branch instructions, ending the basic blocks, are predicted to affect an order of basic block execution. In this example, branch instructions are predicted to be taken, leading to a non-sequential order of basic block execution. In some embodiments and/or usage scenarios, predicted direction of a branch instruction varies over time in some circumstances, such as after a mis-prediction.

Basic blocks in FIG. 3A contain instructions of a reference architecture. For the purposes of the example of FIG. 3A, only two types of instructions are considered: branch instructions (illustrated as BR-02 302, BR-05 305, BR-07 307, BR-09 309, BR-13 313, BR-16 316, and BR-18 318), and non-branch instructions (illustrated as IN-01 301, IN-03 303, IN-04 304, IN-06 306, IN-08 308, IN-10 310, IN-11 311, IN-12 312, IN-14 314, IN-15 315, and IN-17 317).

FIG. 3B illustrates selected details of an example of fusing of operations in traces of operations translated from a plurality of basic blocks in a predicted execution order. The examples illustrated in FIGS. 3B, 3C, 4, and 5 are simplified for ease of exposition; for example, only fusing of pairs of operations is illustrated. In other embodiments, not shown in FIGS. 3B, 3C, 4, or 5, collections of three or more operations are fused. FIG. 3B uses a subset of the basic blocks of FIG. 3A in predicted execution order 333 to yield a basic block sequence 131.0, 131.2, 131.4, 131.1, 131.6, and 131.2. In the example of FIG. 3B, each basic block is treated as a separate trace, respectively producing traces 141.0, 141.2, 141.4, 141.1, 141.6, and 141.2 in operation order 343. In various embodiments, operation order 343 represents an order in which a Trace Unit, such as TU 102, as shown in FIG. 1B, supplies operations of one or more traces to a core of a processor.

Instructions of a reference architecture in the basic blocks are translated into operations compatible with a target architecture in the traces. In the example of FIG. 3B, non-branch instructions from FIG. 3A are translated into single operations with a corresponding number. For example, instruction IN-01 301 is translated into operation OP-01 321, IN-03 303 is translated into OP-03 323, and so forth. Further, branch instructions from FIG. 3A, such as branch instructions BR-02 302, BR-05 305, and so forth are translated into respective assert operations, such as AS-02 322, AS-05 325, and so forth. In some embodiments, not shown in FIG. 3B, some instructions are translated into multiple operations. In some embodiments, not shown in FIG. 3B, some or all branch instructions are translated into branch operations.

FIG. 3B also illustrates a fusing of operations into fused operations. A pair of operations shown adjacent at a same vertical position is fused into a single operation; the operations are shown as a pair (rather than as a single, fused operation) to more clearly identify corresponding source instructions for purposes of example. As shown in FIG. 3B, assert operations (translated from branch instructions) are fused with other operations, as permitted by details of the target architecture and a nature of the operations. For example, OP-01 321 is fused with an assert operation, AS-02 322, forming fused assert operation 381.

In FIG. 3B, the traces (each obtained from a single basic block) contain only a small number of operations, and opportunities to fuse operations are limited. In some traces, such as trace 141.4, assert operations are moved to an earlier position in the trace (as compared to a position of a corresponding branch instruction in a basic block from which the trace was translated) to confirm correctness of a branch prediction as soon as possible. Of course, ability to move an assert operation earlier may be limited by dependencies, such as needing correct values of status flags for the assert operation.

FIG. 3B also illustrates results of pair and no-pair decisions, as shown in FIG. 2. For example, basic block 131.4, as shown in FIG. 3A, contains instructions IN-10 310, IN-11 311, IN-12 312, and BR-13 313, and the instructions are translated into corresponding operations OP-10 330, OP-11 331, OP-12 332, and AS-13 333. The operations are optimized, resulting in trace 141.4, as shown in FIG. 3B. In one possible sequence of optimizations, first operation OP-10 330 is unable to be paired with subsequent ones of the operations (a "no-pair" decision), and is emitted unchanged. Operation OP-11 331 is able to pair with operation AS-13 333, and operations OP-11 311 and AS-13 333 are emitted as single, fused operation 383. There are no further operations for operation OP-12 332 to be paired with, and operation OP-12 332 is emitted unchanged. A further optimization is shown as having been performed to produce trace 141.4—the fused pair of operations OP-11 311 and AS-13 333 is moved earlier in a sequence of operations in the trace, under an assumption that no dependency with operation OP-10 330 prevents this, to enable operation AS-13 333 to execute earlier in the sequence of operations.

FIG. 3C illustrates selected details of an example of fusing of operations in traces of operations translated from a plurality of basic blocks in a predicted execution order, some of the traces comprising more than one basic block. FIG. 3C uses a subset of the basic blocks of FIG. 3A in predicted execution order 333 to yield a basic block sequence 131.0, 131.2, 131.4, 131.1, 131.6, and 131.2. In the example of FIG. 3C, some basic blocks are treated as one trace, producing traces 151.0 from basic block 131.0, and 151.2 from basic block 131.2, and other basic blocks are grouped into a single trace, such as basic blocks 131.2 and 131.4 forming trace 151.24, or basic blocks 131.1 and 131.6 forming trace 151.16. In various embodiments, a trace is comprised of one or more basic blocks, though the example of FIG. 3C only shows traces comprised of two basic blocks. The operations among the traces are in operation order 353. In various embodiments, operation order 353 represents an order in which a Trace Unit, such as TU 102, as shown in FIG. 1B, supplies operations of one or more traces to a core of a processor.

As illustrated in FIG. 3C (similar to FIG. 3B), instructions of a reference architecture in the basic blocks are translated into operations compatible with a target architecture. In the example of FIG. 3C, instructions from FIG. 3A are translated into single operations identically as in FIG. 3B. In some embodiments, not shown in FIG. 3C, some instructions are translated into multiple operations. In some embodiments, not shown in FIG. 3C, some or all branch instructions are translated into branch operations.

FIG. 3C also illustrates a fusing of operations into fused operations. A pair of operations shown adjacent at a same vertical position is fused into a single operation; the operations are shown as a pair (rather than as a single, fused operation) to more clearly identify corresponding source instructions for purposes of example. For example, operations OP-06 326 and OP-10 330 are fused, forming fused operation 391. As shown in FIG. 3C, assert operations (translated from branch instructions) can be fused with other operations, as permitted by details of the target architecture and a nature of the operations. For example, OP-04 324 is fused with an assert operation, AS-18 338, forming fused assert operation 393.

FIG. 3C illustrates optimizations where a trace crosses basic block boundaries. Trace 151.24 contains all of the operations translated from instructions in basic blocks 131.2 and 131.4. Branch instructions BR-07 307 and BR-13 313 are translated into assert operations AS-07 327 and AS-13 333, and the assert operations are moved earlier in the trace, if possible. In various embodiments, an assert operation corresponding to a final branch instruction in basic blocks from which a trace is translated is preferentially moved to an earlier position in the trace, so that evaluation of correctness of predicting a following trace is carried out as soon as possible.

In some embodiments, use of assert operations enables multiple basic blocks to be combined into a single trace.

Example of Flag-Setting Optimization in a Trace

Figure 4:
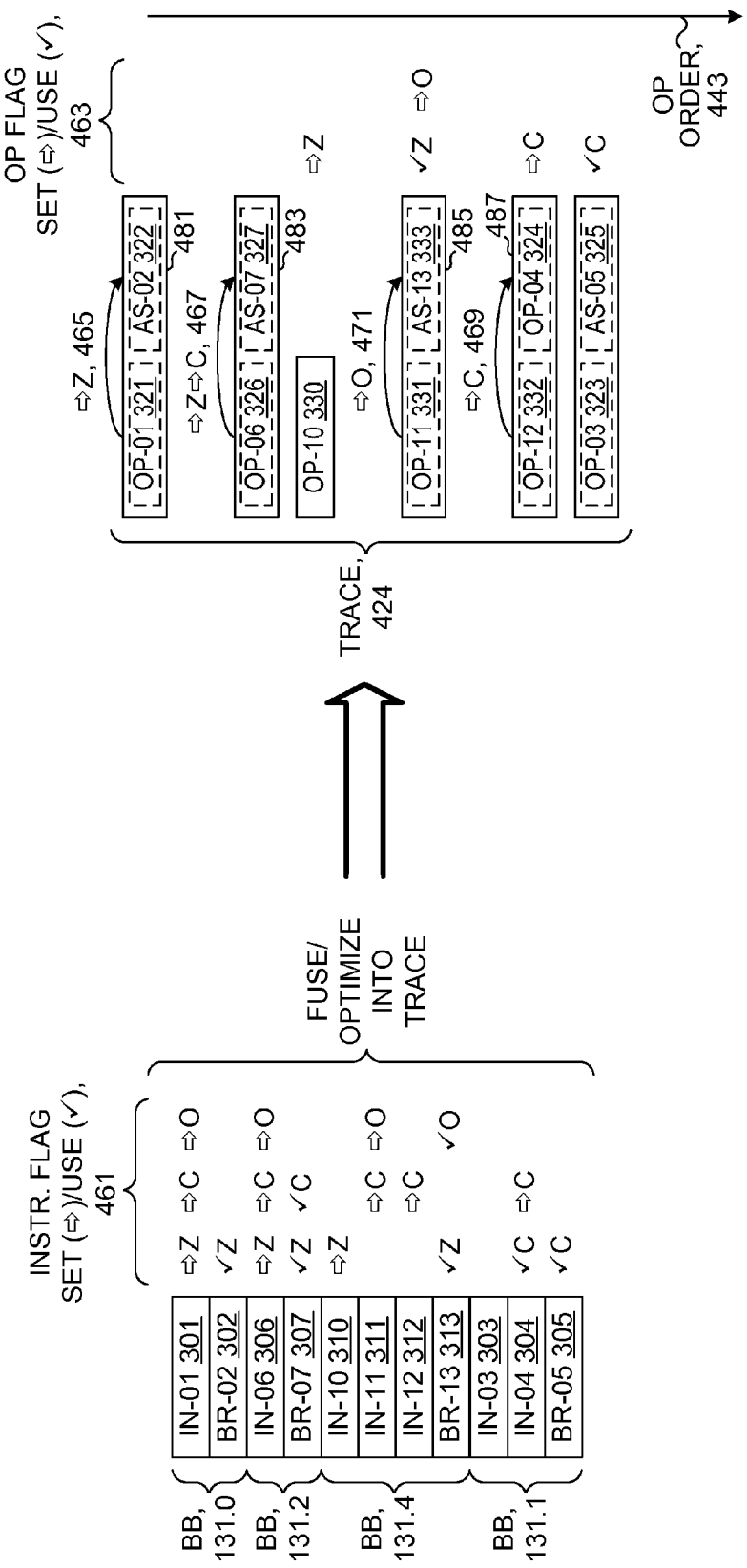
FIG. 4 illustrates selected details of an example of optimizing setting and using of flags as part of fusing of operations in a trace.

FIG. 4 illustrates selected details of an example of optimizing setting and using of flags as part of fusing of operations in a trace. FIG. 4 uses a subset of the basic blocks of FIG. 3A in predicted execution order 333 to yield a basic block sequence 131.0, 131.2, 131.4, and 131.1. In the example of FIG. 4, the basic block sequence is grouped and translated into a single trace 424, and optimized as a unit. The trace is in operation order 443. In various embodiments, operation order 443 represents an order in which a Trace Unit, such as TU 102, as shown in FIG. 1B, supplies operations of one or more traces to a core of a processor.

As illustrated in FIG. 4 (similar to FIGS. 3B and 3C), instructions of a reference architecture in the basic blocks are translated into operations compatible with a target architecture. In the example of FIG. 4, instructions from FIG. 3A are translated into single operations identically as in FIG. 3B. In some embodiments, not shown in FIG. 4, some instructions are translated into multiple operations. In some embodiments, not shown in FIG. 4, some or all branch instructions are translated into branch operations.

FIG. 4 also illustrates a fusing of operations into fused operations. A pair of operations shown adjacent at a same vertical position is fused into a single operation; the operations are shown as a pair (rather than as a single, fused operation) to more clearly identify corresponding source instructions for purposes of example. As shown in FIG. 4, assert operations (translated from branch instructions) are fused with other operations, as permitted by details of the target architecture and a nature of the operations. For example, OP-06 326 is fused with an assert operation, AS-07 327, forming fused assert operation 483.

FIG. 4 shows how basic blocks of instructions are translated, fused, and optimized for flag-setting to produce a trace. A table 461 adjacent to the basic blocks shows a particular group of flags specified to be set (⇨) or specified to be used (✓) by each instruction; a similar table 463 adjacent to the fused operations of the trace shows a reduced group of flags specified to be set (⇨) or specified to be used (✓) by each operation (fused and not fused). The fused operations also have indications, such as arrow 465 labeled with ⇨Z, showing implicit usage of flags in a fused operation. For the purposes of the example of FIG. 4, only three flags (Z, C, and O) are considered. In various embodiments, there are more flags. In various embodiments, there are fewer flags. In various embodiments, instructions (or operations) optionally specify a flag or a subset of flags to be set (or to be used). In various embodiments, there are a plurality of flags, and instructions (or operations) specify one flag to be set (or to be used).

In various embodiments, many instructions in a reference architecture specify setting flags, and fewer instructions specify using flags, leading to cases where a first instruction specifies setting a flag and an immediately-following instruction specifies setting the same flag, rendering setting of the flag by the first instruction unobservable if the following instruction is ultimately executed immediately after the first instruction (i.e. there is no exception recognized between the instructions). In various embodiments, some branch instructions only specify using a portion of all flags that are settable, leading to further cases where specifying setting of a flag is not observable.

For example in FIG. 4, given the order fused operations appear in trace 424, the flag-setting specified by OP-01 321 (translated from IN-01 301, and part of fused operation 481) is the same as the flag-setting specified by OP-06 326 (translated from IN-06 306, and part of fused operation 483); in other words OP-01 and OP-06 modify the same flags. The only intervening instruction is a branch instruction BR-02 302 (translated to assert operation AS-02 322, and part of fused operation 481) that only specifies a use of the Z flag. Hence, the specification of setting the C and O flags by IN-01 301 is not observable, and does not have to be performed by fused operation 481. Further, the Z flag is only observable by assert operation AS-02 322, and as indicated by arrow 465, the target architecture enables an implicit passing of the flag-setting result of operation OP-01 321 to assert operation AS-02 322 (as a portion of the function of fused operation 481) without a need to update architectural state associated with the Z flag.

Continuing in FIG. 4, similarly, as part of fused operation 483, OP-06 326 implicitly passes flags used by fused assert operation AS-07 327 (as illustrated by arrow 467) and omits production of other flag information, since following operations OP-10 330 and OP-11 331 (part of fused operation 485) produce the other flags. Hence, fused operation 483 also does not need to update architectural state associated with flags.

OP-11 331 (translated from IN-11 331, and part of fused operation 485), however, corresponds to a last instruction underlying the trace to specify setting of the O flag. All flags are assumed to be live out at the end of a trace, so a final setting of a flag in the trace cannot be optimized away. Thus fused operation 485 specifies setting of architectural state associated with the O flag.

For similar reasons, OP-04 324 (part of fused operation 487) specifies setting the C flag, since IN-04 304 is a last instruction underlying the trace to specify setting the C flag.

Flag state, in some embodiments, is implicitly passed within a fused operation, and optionally also sets architectural state. For example, fused operation 485 combining OP-11 331 and AS-13 333 both implicitly passes a value of the 0 flag, and also sets architectural state associated with the 0 flag.

Example of Register-State-Setting Optimization in a Trace

Figure 5:
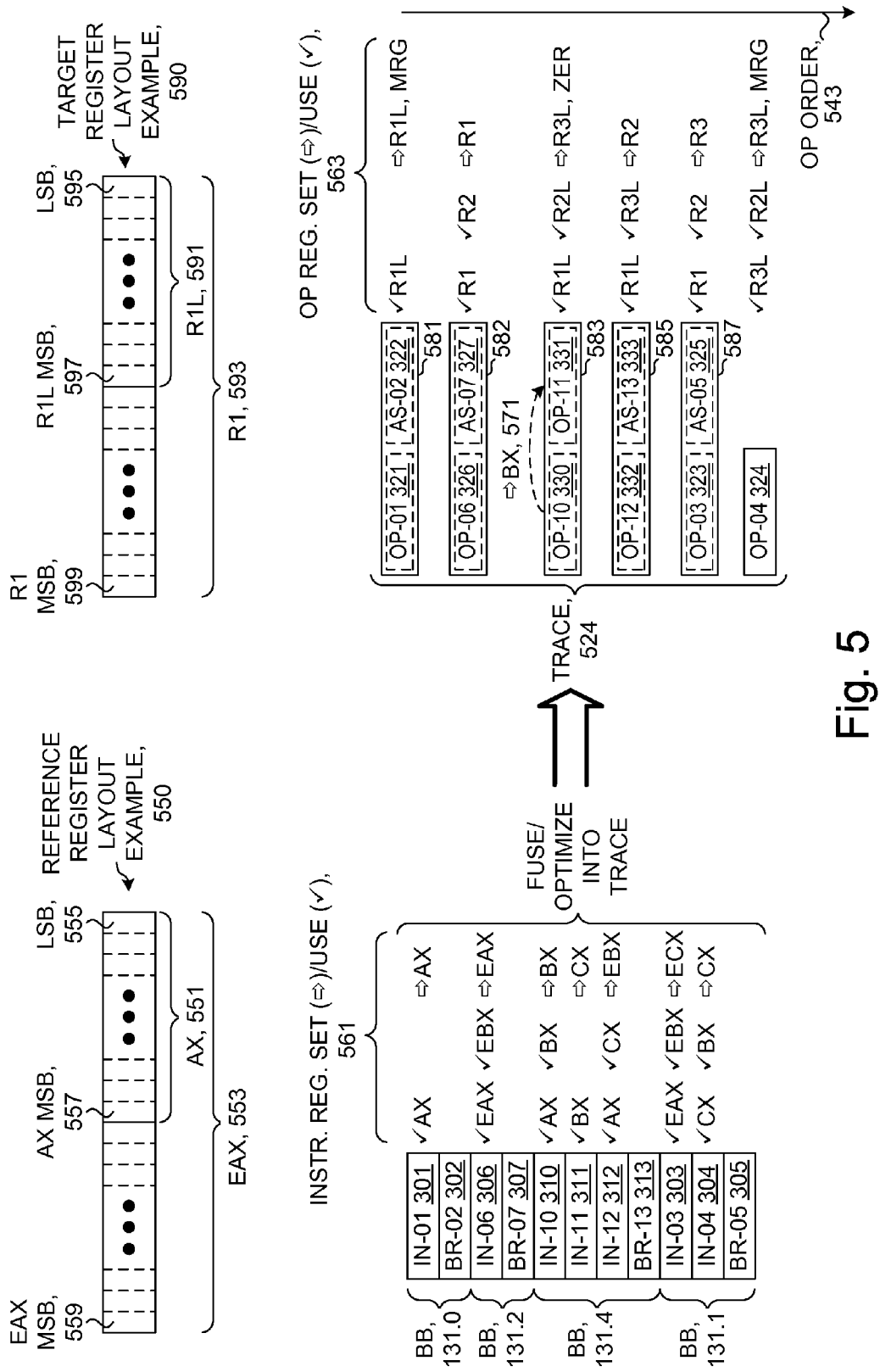
FIG. 5 illustrates selected details of an example of optimizing setting and using of registers as part of fusing of operations in a trace.

FIG. 5 illustrates selected details of an example of optimizing setting and using of registers as part of fusing of operations in a trace. FIG. 5 uses a subset of the basic blocks of FIG. 3A in predicted execution order 333 to yield a basic block sequence 131.0, 131.2, 131.4, and 131.1. In the example of FIG. 5, the basic block sequence is grouped and translated into a single trace 524, and optimized as a unit. The trace is in operation order 543. In various embodiments, operation order 543 represents an order in which a Trace Unit, such as TU 102, as shown in FIG. 1B, supplies operations of one or more traces to a core of a processor.

As illustrated in FIG. 5 (similar to FIGS. 3B, 3C, and 4), instructions of a reference architecture in the basic blocks are translated into operations compatible with a target architecture. In the example of FIG. 5, instructions from FIG. 3A are translated into single operations identically as in FIG. 3B. In some embodiments, not shown in FIG. 5, some instructions are translated into multiple operations. In some embodiments, not shown in FIG. 5, some or all branch instructions are translated into branch operations.

FIG. 5 also illustrates a fusing of operations into fused operations. A pair of operations shown adjacent at a same vertical position is fused into a single operation; the operations are shown as a pair (rather than as a single, fused operation) to more clearly identify corresponding source instructions for purposes of example. As shown in FIG. 5, assert operations (translated from branch instructions) can be fused with other operations, as permitted by details of the target architecture and a nature of the operations. For example, OP-03 323 is fused with an assert operation, AS-05 325, forming fused assert operation 587.

FIG. 5 shows how basic blocks of instructions are translated, fused, and optimized for register-state-setting to produce a trace. A table 561 adjacent to the basic blocks shows a particular group of registers of a reference architecture specified to be set (⇨) or specified to be used (✓) by each instruction; a similar table 563 adjacent to the fused operations of the trace shows a renamed group of registers of a target architecture specified to be set (⇨) or specified to be used (✓) by each fused operation. For the purposes of the example of FIG. 5, only a few registers are considered. In various embodiments, there are more registers. In various embodiments, there are multiple types of registers.

In the example of FIG. 5, the reference architecture has instructions that specify only setting or using a portion of a register. Reference architecture register layout example 550 illustrates a naming convention (the absence or presence of the letter 'E' as a prefix) used to refer to either a lower portion of a register (AX 551), or to the entire register (EAX 553). Some instructions of the reference architecture instruction set specify only setting or using a lower portion of a register, such as IN-01 301, which specifies setting only AX (a lower portion of EAX), or IN-10 310, which specifies using BX (a lower portion of EBX). Other instructions of the reference architecture instruction set specify setting an entire register, such as IN-03 303, which specifies setting ECX. Some instructions of the reference architecture instruction set specify mixed portions of registers, such as IN-12 312, which specifies using AX and CX, but specifies setting EBX.

In a similar manner, the example target architecture used in FIG. 5 has operations that specify only setting or using a portion of a register. Target architecture register layout example 590 illustrates a naming convention (the presence or absence of the letter 'L' as a suffix) used to refer to either a lower portion of a register (R1L 591), or to the entire register (R1 593). Some instructions of the target architecture instruction set specify only setting or using a lower portion of a register, such as OP-01 321 (part of fused operation 581), which specifies setting only R1L (a lower portion of R1), or OP-04 324, which specifies using R3L (a lower portion of R3). Other instructions of the target architecture instruction set specify setting an entire register, such as OP-03 323 (part of fused operation 587), which specifies setting R3. Some instructions of the target architecture instruction set specify mixed portions of registers, such as OP-12 312 (part of fused operation 585), which specifies using R1L and R3L, but specifies setting R2.

Continuing in the example of FIG. 5, in various embodiments, determining which portions of a register to set, to merge, to zero, or optionally to leave unchanged, is based, at least in part, on an examination of subsequent operations. In some embodiments, all subsequent operations in a trace are considered. In other embodiments, all operations within a window are considered. In various embodiments, the window moves as a determination on an operation is made. For example, in trace 524, fused operation 583 combining OP-10 330 and OP-11 331 specifies setting a destination register R3L (ignoring, for the moment, a "ZER" specification, explained elsewhere herein). R3L is used in a subsequent operation, and hence setting R3L is observable, but a higher portion of R3 is not observable since a subsequent operation specifies setting all of R3 prior to any subsequent operation using the higher portion of R3. Hence, fused operation 583 could assign an arbitrary value to the higher portion of R3, with no effect on execution of the trace.

With further regard to fused operation 583, note that OP-10 330 (translated from IN-10 310) specifies setting R2L (BX). Because a subsequent operation sets R2 (EBX) prior to any subsequent operation using R2L (BX), the specification to set R2L by OP-10 330 and to use R2L by OP-11 331 in a same fused operation is not observable. Accordingly, OP-10 330 and OP-11 331 can be fused without a need to generate an intermediate result of OP-10 330. Dashed arrow 571 indicates the implicit passing of a value of BX between OP-10 330 and OP-11 331 as part of the function of fused operation 583. In various embodiments, the value of BX exists in some transitory state on wires or in flip-flops or other storage elements of an execution unit. In various embodiments, the value of BX is only represented as part of a function of a multiple-input ALU and is not observable in any fashion.

Not shown in the example of FIG. 5, is a use of register renaming, where registers, in some embodiments, change names in some circumstances, when the registers are written. In some embodiments, register renaming is dynamic in that renaming is done on-the-fly as operations are prepared for scheduling and/or issuing. For example, OP-01 321 (part of fused operation 581) is translated from IN-01 301, which specifies both using and setting a single register—AX (a lower portion of EAX). OP-01 321 similarly specifies both using and setting a single register—R1L (a lower portion of R1). With register renaming, however, OP-01 321 would specify using R1L, but specify setting another register, such as R7L, due to renaming. With register renaming, an identity of a register of a target architecture corresponding to a register of a reference architecture changes dynamically as operations with renamed registers are executed. With register renaming, setting only a portion of a target architecture register implies merging results of execution of an operation with another target architecture register holding pre-operation architectural state of a corresponding reference architecture register. Using the example above regarding a renamed version of OP-01 321, while R7L (a lower portion of R7) is set to a result of the operation, a higher portion of R7 is set to a corresponding higher portion of R1, corresponding to a higher portion of EAX, to preserve the higher portion of EAX. In various embodiments, merging of registers is made explicit in the target architecture, as shown in table 563 with respect to OP-01 321 (part of fused operation 581), which specifies setting "R1L, MRG", meaning that R1L is set, and a higher portion of R1 is merged from a register holding pre-operation architectural state of a corresponding reference architecture register. As can be seen from the example of FIG. 5, OP-01 321 merges R1L because a subsequent operation (OP-06 326, part of fused operation 582) uses all of R1, prior to any operation specifying setting at least a higher portion of R1.

In a similar fashion to merging, in various embodiments a portion of a register not specified to be set by an operation, is zeroed. In trace 524, fused operation 583 combining OP-10 330 and OP-11 331 specifies setting a destination register "R3L, ZER", meaning that R3L is set, and a higher portion of R3 is zeroed. As can be seen in the example of FIG. 5, a higher portion of R3 is subsequently set (by OP-03 323, part of fused operation 587) prior to any subsequent use, and hence a value of the higher portion of R3 is not observable. In various embodiments, zeroing a portion of a register is more efficient than merging. In some embodiments, not shown in FIG. 5, a higher portion of a register is left unchanged, rather than merging or zeroing.

Example of a Process for Fusing Operations

Figure 6:
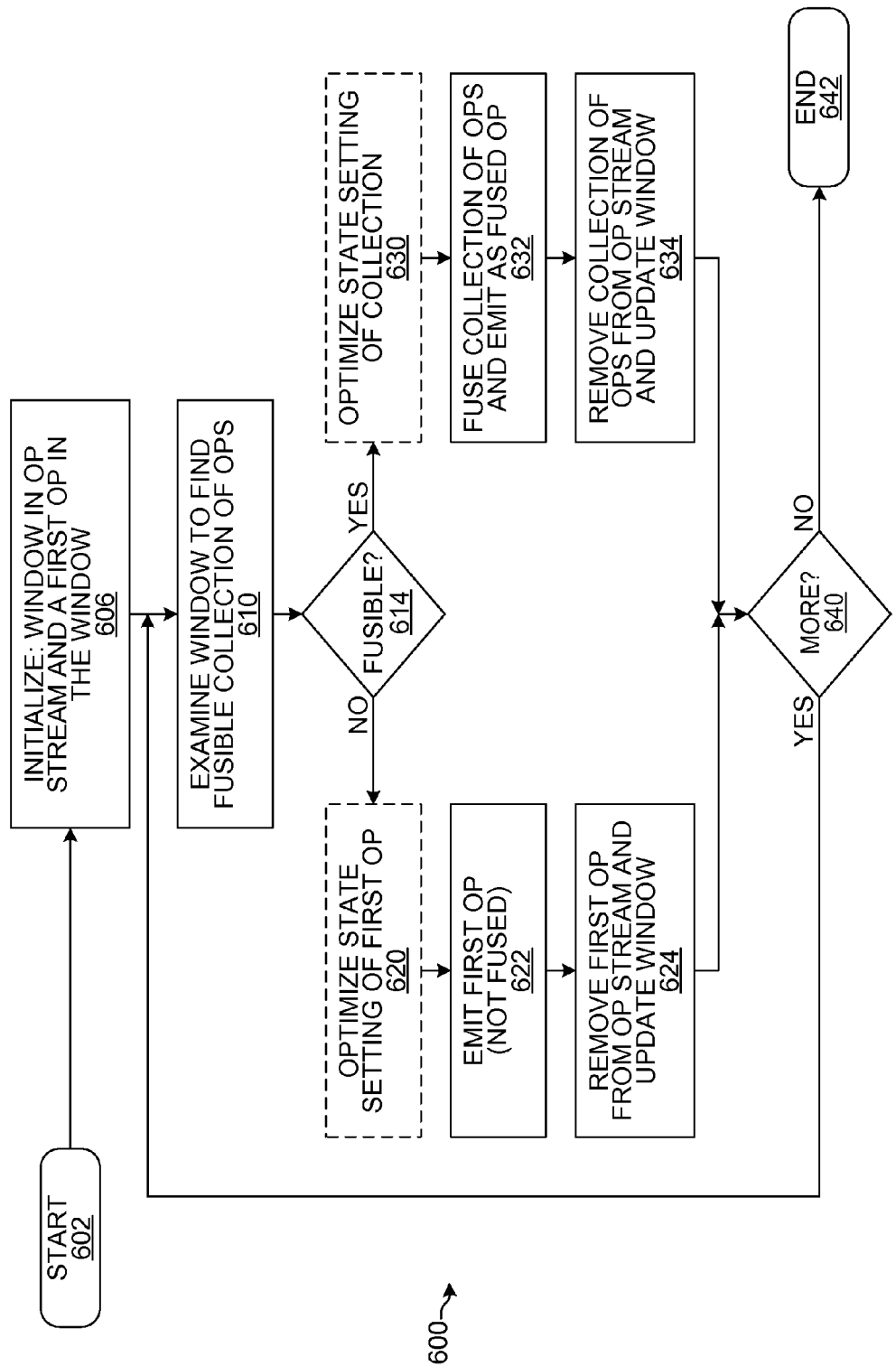
FIG. 6 illustrates selected details of an embodiment of the invention as a process for fusing operations in an operation stream.

FIG. 6 illustrates selected details of an embodiment of the invention as a process for fusing operations in an operation stream. In various embodiments, the operation stream corresponds to an instruction image or a portion of an instruction image. In various embodiments, operations in the operation stream are in a predicted execution order. In various embodiments, the operation stream is a trace. In various embodiments, the process illustrated in FIG. 6 embodies a similar procedure to that shown in the example of FIG. 2. While process 600 is generalized to finding fusible collections of operations, the process is easily restricted to one for pairs of operations, rather than collections (that, in some usage scenarios, are larger than pairs).

Process 600 starts in block 602, and continues with block 606. In block 606, in various embodiments, a window of operations to be considered in an input operation stream and a first operation in the window are initialized. In some embodiments, the first operation is a first operation in the window of operations; in other embodiments, the first operation is a last operation in the window of operations. In various embodiments, the first operation is chosen based on possible fusible collections of operations in the window of operations (as in block 610). Processing continues with block 610.

Block 610 examines operations in the window of operations, attempting to find a fusible collection of operations. In various embodiments, block 610 finds a first fusible collection of operations, one of which is the first operation. In various embodiments, block 610 finds a best fusible collection of operations, one of which is the first operation. In various embodiments, block 610 finds a best fusible collection in the window of operations. Processing continues with block 614.

A determination as to whether a collection of operations is fusible, and how different fusible collections of operations compare as possible choices, is a function of at least a target architecture and details of the collections of operations. In various embodiments, the combined architectural functionality of a collection of operations is representable in a single, fused operation in the target architecture. In various embodiments, the combined observable functionality of a collection of operations is representable in a single, fused operation in the target architecture. In some embodiments, an efficiency improvement, such as a performance improvement or a power improvement, is used to rate candidate collections of operations to choose a best collection. In some embodiments, a code size reduction metric is used to rate candidate collections of operations. In some embodiments, a combination of various improvements and/or metrics is used to rate candidate collections of operations.

Block 614 determines if a fusible collection of operations has been found in block 610. If a fusible collection of operations has not been found, processing continues with block 620. If a fusible collection of operations has been found, processing continues with block 630.

In blocks 620 through 624, no fusible collection of operations has been found in the window of operations. In some embodiments, a selected first operation in the window is emitted to remove at least one operation from the window of operations, to update the window of operations and consider other operations. In other embodiments, not shown in FIG. 6, the window of operations is enlarged to consider other operations in the operation stream.

Figure 7:
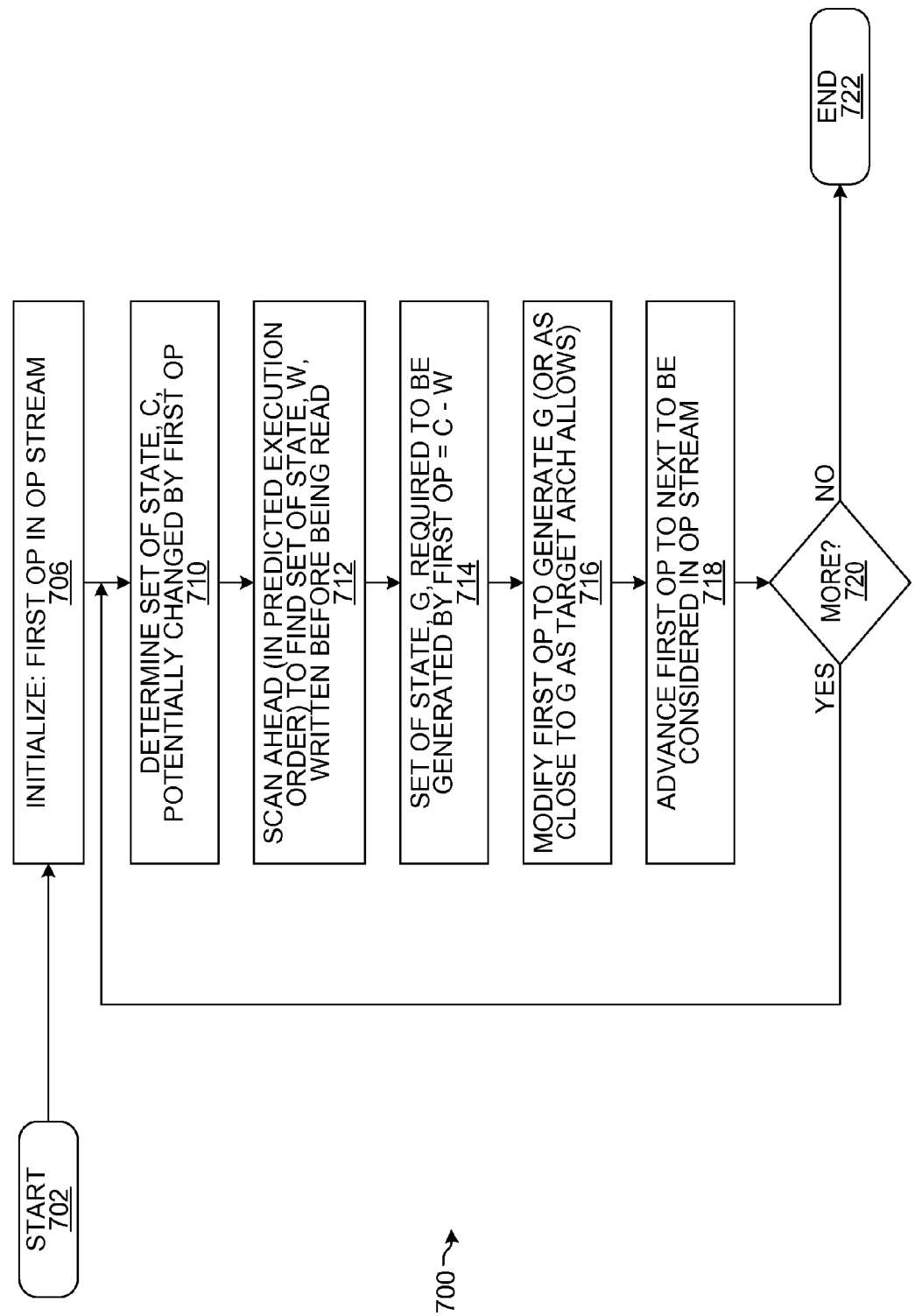
FIG. 7 illustrates selected details of an embodiment of the invention as a process for optimizing state-setting of operations.

Block 620 is optional, to optimize state-setting of the first operation. In various embodiments, optimization of state-setting optimizes flag-setting, as illustrated by example in FIG. 4. In various embodiments, optimization of state-setting optimizes register-setting, as illustrated by example in FIG. 5. In some embodiments, optimization of state-setting uses a process similar to process 700, as shown in FIG. 7. Processing continues with block 622.

Block 622 emits, into an output operation stream, the (possibly optimized) first operation. Processing continues with block 624, which removes the first operation from the input operation stream, and updates the window of operations to account for the removed operation and to consider other operations. Processing continues with block 640.

In blocks 630 through 634, a fusible collection of operations has been found in the window of operations. In some embodiments, the collection of operations is fused into a single operation, which is then emitted into an output operation stream. In various embodiments, the collection of operations is removed from the input operation stream, and the window of operations is updated to consider other operations.

Block 630 is optional, to optimize state-setting of the collection. In various embodiments, optimization of state-setting optimizes flag-setting, as illustrated by example in FIG. 4. In various embodiments, optimization of state-setting optimizes register-setting, as illustrated by example in FIG. 5. In some embodiments, optimization of state-setting uses a process similar to process 700, as shown in FIG. 7. Processing continues with block 632.

Block 632 produces a fused operation from the fusible collection of operations, and emits, into an output operation stream, the (possibly optimized) fused operation. Processing continues with block 634, which removes the collection of operations from the input operation stream, and updates the window of operations to account for the removed operations and to consider other operations. Processing continues with block 640.

Block 640 determines whether there is a possibility to search for further fusible collections of operations in the operation stream. If more fusible collections of operations are to be searched for, processing returns to block 610 to search for a fusible collection of operations in the new window of operations. If no more fusible collections of operations are to be searched for, processing ends with block 642. In various embodiments, processing ends when the window of operations has reached an end of the input operation stream. In various embodiments, processing ends when no more fusible collections of operations can be found. In various embodiments, processing ends after an amount of efficiency improvement, such as a code-size savings, or a performance improvement, has been achieved.

Example of a Process for Optimizing State-Setting of Operations

FIG. 7 illustrates selected details of an embodiment of the invention as a process for optimizing state-setting of operations in an operation stream. In various embodiments, the operation stream corresponds to an instruction image or a portion of an instruction image. In varous embodiments, operations in the operation stream are in a predicted execution order. In various embodiments, the operation stream is a trace. In various embodiments, the operation stream has already undergone other forms of optimization. In various embodiments, the operation stream contains fused operations. In some embodiments, process 700 implements a similar procedure to that shown in the examples of FIG. 4 (for flag state) and FIG. 5 (for register state). In some embodiments, process 700 proceeds in parallel with process 600, as shown in FIG. 6. In some embodiments, a single hardware engine controls parallel operation of both process 600 and process 700.

Process 700, in some embodiments, optimizes state-setting of multiple types of state, such as flag state and register state, at least partially in parallel or overlapped in time. In various embodiments, process 700 optimizes state-setting of all or a portion of a destination register of an operation. In various embodiments, process 700 optimizes state-setting of a set of architectural flags as a single entity, optimizing state-setting of the flags as a whole, rather than as individual flags. In various embodiments, process 700 optimizes state-setting of architectural flags individually, so that state-setting of a first flag is optimized independent of state-setting of a second flag.

Process 700 starts in block 702, and continues with block 706. Block 706 initializes a first operation to be examined in an input operation stream. In some embodiments, the first operation is a first operation in the operation stream, and processing advances forward through the operation stream; in other embodiments, the first operation is a last operation in the operation stream, and processing advances backward through the operation stream. Processing continues with block 710.

Block 710 determines a set of architectural state, C, that is modified by the first operation. For example, an operation might specify setting a destination register, or specify modifying one or more flags. In various embodiments, specification of architectural state modified by an operation is implicit. For example, a push operation implicitly updates a stack pointer. Processing continues with block 712.

Block 712 scans ahead of the first operation in the operation stream to determine a set of architectural state, W, that is set prior to being used. For example, a subsequent operation in the operation stream specifies setting of a flag, prior to any other subsequent operation specifying using of the flag. In various embodiments, the scan ahead considers a fixed window of operations. In various embodiments, the fixed window of operations is the same as a window of operations used in process 600, as shown in FIG. 6. In various embodiments, the scan ahead considers all operations until the end of the operation stream. Processing continues with block 714.

Block 714 determines a set of architectural state, G, that is modified by the first operation and is observable by subsequent operations. In various embodiments, G is computed as C-W, i.e., a set of state modified by the first operation, and subsequently not set prior to being used. Processing continues with block 716.

Block 716 determines if there is a better representation for the first operation in a target architecture by taking advantage of a case where the set of state G required to be set for observable functionality is a proper subset of the set of state C required to be set architecturally. If there is a better representation for the first operation that modifies less state than all of C, but at least G, the first operation is replaced with the better representation. In various embodiments, an efficiency improvement, such as a code-size reduction, or a performance improvement, or a power improvement, or some combination thereof, is used to determine if an alternative representation is better. Processing continues with block 718.

Block 718 advances the first operation to consider a next operation in the input operation stream. In various embodiments, advancing the first operation moves the first operation to a next operation in a predicted execution order in the operation stream. Processing continues with block 720.

Block 720 determines whether there is a possibility to examine further operations in the input operation stream for possible optimization. If more operations are to be examined, processing returns to block 710 to examine more operations. If no more operations are to be examined, processing ends with block 722. In various embodiments, processing ends when the first operation has reached an end of the operation stream. In various embodiments, processing ends after an amount of efficiency improvement, such as a code-size savings, or a performance improvement, or a power reduction, has been achieved.

Example of Operation Fusing Using a Pending Operation Renaming Table

FIG. 8 illustrates selected details of an example of operation fusing a pending operation renaming table. Operation stream 800, comprising operations 890-899, is an example stream of operations in a high-level (assignment statement) syntax. In operation stream 800, AX, BX, and CX are reference architecture registers, MEM_A and BASE are memory addresses (constants), and LOAD[ ] represents a load operation accessing memory at a given address. In various embodiments, the given address is obtained, at least in part, from one or more of a constant, a register, and the result of an address computation.

Pending Operation Renaming Table (PORT) with state transitions 810 shows contents of a PORT as each operation in operation stream 800 is processed. In some embodiments, the PORT is at least a portion of a fusing agent, such as Hardware Fuser 176, as shown in FIGS. 1A and 1B. In the example of FIG. 8, the PORT contains an entry for each one of a set of target architecture registers, R1 through R3 (851-853). In various embodiments, each reference architecture register has a fixed association with a target architecture register. In the example of FIG. 8, reference architecture register AX is associated with target architecture register R1 851, and similarly, BX is associated with R2 852, and CX with R3 853. In various embodiments, each reference architecture register of each trace being executed has a fixed association with a target architecture register, so that a same reference architecture register specified to be set or to be used in two different traces is associated with a different target architecture register for each trace. In some embodiments, not shown in FIG. 8, each reference architecture register is dynamically associated with a target architecture register via register renaming logic.

For purposes of illustration, Pending Operation Renaming Table with state transitions 810 shows an entry Emit 859 in addition to entries for target architecture registers, R1 through R3 (851-853). Emit 859 is not part of the PORT, but serves to illustrate operations that are emitted as each operation in operation stream 800 is processed.

In INITIAL state 839, prior to any operations being processed, the target architecture registers in the PORT have an identity mapping. Each entry indicates each target architecture register holds contents of a corresponding reference architecture register. As operations are processed, the mapping in the PORT is changed.

Operation I0 890 is a load operation setting destination register AX (R1). In various embodiments, load operations cannot be posted in the PORT because other operations cannot be fused to a load operation. Accordingly, after processing associated with I0, the PORT shows that the mapping is unchanged (see Post I0 State 840), and that translated load operation 831 is emitted.

Operation I1 891 is an arithmetic operation setting destination register AX (R1). In various embodiments, various arithmetic operations can be posted in the PORT. Accordingly, after processing associated with I1, the PORT shows that entry 851 for R1 is changed to represent the arithmetic function of the I1 operation (see Post I1 State 841). The operation has not yet been emitted; it remains pending for potential fusing with other operations.

Operation I2 892 is another arithmetic operation setting destination register AX (R1). In various embodiments providing three-input ALU operations, operation I2 can be fused with operation I1. Accordingly, after processing associated with I2, the PORT shows that entry 851 for R1 is updated to have functionality fusing operations I1 and I2 (se Post I2 State 842).

Operation I3 893 is an arithmetic operation setting destination register CX (R3). Accordingly, after processing associated with I3, the PORT shows that entry 853 for R3 is changed to represent the arithmetic function of the I3 operation (see Post I3 State 843).

Operation I4 894 is an assert operation using a flag (Z) set by a previous operation. In various embodiments, many arithmetic operations set flags. In the example of FIG. 8, operation I3 (implicitly) sets the Z flag that operation I4 tests, and operation I4 can be fused with operation I3, forming a fused assert operation. In various embodiments, an assert operation can be fused to another operation that is already in the PORT; a subsequent operation cannot be fused to an assert operation that is already in the PORT, or to a fused assert operation that is already in the PORT. In various embodiments, an assert operation, possibly fused with an operation already in the PORT, is emitted as it is processed. Accordingly, after processing associated with I4, the PORT shows that fused assert operation 832 is emitted, and entry 853 for destination register R3 of the fused assert operation is reset to the identity mapping (see Post I4 State 844).

Operation I5 895 is an arithmetic operation setting destination register AX (R1). In various embodiments, constant folding is provided, enabling some arithmetic operations with constants to be fused into other operations without requiring additional ALU inputs. Accordingly, after processing associated with I5, the PORT shows that entry 851 for R1 is updated to have the fused (constant-folded) functionality. The functionality specified in the PORT in entry 851 for R1 fuses operations I1, I2, and I5 (see Post I5 State 845).

Operation I6 896 is an arithmetic operation setting destination register CX (R3). One of the source registers of operation I6, AX (R1), is mapped in the PORT to a pending operation. In various embodiments, if a pending operation can be fused into a current operation, no operations need be emitted. In the example of FIG. 8, an assumption is that the pending operation cannot be fused into operation I6. Accordingly, after processing associated with I6, the PORT shows that fused operation 833 is emitted for register R1 (AX), that entry 851 for register R1 is reset to the identity mapping, and that entry 853 for R3 is changed to represent the arithmetic function of the I6 operation (see Post I6 State 846).

Operation I7 897 is another arithmetic operation setting destination register CX (R3). In various embodiments providing three-input ALU operations, operation I7 can be fused with operation I6. Accordingly, after processing associated with I7, the PORT shows that entry 853 for R3 is updated to specify functionality of operations I6 and I7 fused together (se Post I7 State 847).

Operation I8 898 is a load operation setting destination register CX (R3). In various embodiments, load operations cannot be posted in the PORT because other operations cannot be fused to a load operation. One of the source registers of operation I8, CX (R3), is mapped in the PORT to a pending operation. In the example of FIG. 8, the pending operation can be fused to the load instruction, so a fused load instruction is emitted, and after processing associated with I8, the PORT shows that the mapping of entry 853 for R3 is reset to the identity mapping (see Post I8 State 848). In some embodiments, the pending operation could not be fused to the load, and two operations would be emitted—the pending operation, and the load operation.

Operation I9 899 is an arithmetic operation setting destination register AX (R1). Accordingly, after processing associated with I9, the PORT shows that entry 851 for R1 is changed to represent the arithmetic function of the I9 operation (see Post I9 State 849).

In the example of FIG. 8, the operation stream ends after operation I9. Restoring the state of the PORT to the identity mapping as a final state requires emitting any pending operations, such as pending operation 835 associated with R1 (see Final State 850).

In various embodiments, the PORT enables operations anywhere in a trace to be fused. Operations do not have to be adjacent, or to be in a same basic block, or to have any special order. All that is required is that the operations be fusible. For example, in FIG. 8, operations I1 891, I2 892, and I5 895 are fused together and emitted as a single fused operation 833.

Example of a Process for Fusing Operations Using a Pending Operation Renaming Table FIG. 9 illustrates selected details of an embodiment of the invention as a process for fusing operations in an operation stream using a Pending Operation Renaming Table (PORT). In various embodiments, the operation stream corresponds to an instruction image or a portion of an instruction image. In various embodiments, operations in the operation stream are in a predicted execution order. In various embodiments, the operation stream is a trace. In some embodiments, the process illustrated in FIG. 9 implements a similar procedure to that shown in the example of FIG. 8.

Each reference architecture register has, in some embodiments, a fixed association with a target architecture register. In various embodiments, each reference architecture register of each trace being executed has a fixed association with a target architecture register, so that a same reference architecture register specified to be set or to be used in two different traces is associated with a different target architecture register for each trace. In various embodiments, each reference architecture register is dynamically associated with a target architecture register via register renaming logic.

Process 900 begins in block 902 and continues in block 904, which initializes a Pending Operation Renaming Table (PORT), such as PORT 810, as shown in FIG. 8. In various embodiments, the PORT is initialized to an identity mapping, wherein each register in a reference architecture is associated with a respective register in a target architecture. In various embodiments, entries in the PORT are initialized to a null (empty) mapping, and each register in a reference architecture is dynamically associated with a target architecture register as needed. Block 904 also initializes processing to start with a first operation in an operation stream, such as a trace, by setting a current operation to be the first operation in the operation stream.

Processing continues with block 906, which examines the current operation and any source operands of the current operation to determine if the current operation is fusible with existing entries in the PORT, and whether the current operation requires any operations to be emitted. In various embodiments, PORT entries associated with register source operands of the current operation are accessed to see if a pending operation of the source operands is fusible. For example, in some usage scenarios, one of multiple source operands of an operation has a fusible entry in the PORT, and another of multiple source operands of an operation does not have a fusible entry in the PORT. In various embodiments, constant source operands are examined to see if the constants can be folded in with an existing operation. In various embodiments, limitations on a size of constants in operations prohibits or limits constant folding.

Processing continues with block 910, which determines, based on a result of block 906, if the current operation is fusible without emitting contents of any entries in the PORT. If the current operation is fusible without emitting contents of any entries in the PORT, processing continues with block 920. If the current operation is not fusible without emitting contents of at least one entry in the PORT, processing continues with block 912. In various embodiments, certain types of operations, such as load operations, cannot be posted in the PORT and are thus emitted as processed. In various embodiments, some operations without a destination register, such as store operations, cannot be posted in the PORT and are thus emitted as processed. In various embodiments, certain types of operations, such as assert operations, cannot be fused with subsequent operations and are thus emitted as processed. In various embodiments, some operations that are emitted as processed can be fused with operations already pending in the PORT prior to being emitted.

In block 912, the current operation is not fusible without emitting contents of at least one entry in the PORT. In various embodiments, entries associated with source operands of the current operation that are fusible are fused to the current operation. In various embodiments, entries associated with source operands of the current operation that are not fusible are emitted. In various embodiments, entries that are emitted are reset to the identity mapping. Processing continues with block 914.

In block 914, it is determined if the current operation can be posted in the PORT. In various embodiments, certain types of operations cannot be posted. If the operation can be posted, processing continues with block 916. If the operation cannot be posted, processing continues with block 918.

In block 916, the current operation can be posted in the PORT. In some embodiments, a PORT entry corresponding to a destination register of the current operation is set to represent a function specified by the current operation (possibly as fused in block 912, and, in further embodiments, considering constant folding). Processing continues with block 930.

In block 918, the current operation cannot be posted in the PORT. For example, in various embodiments, the current operation is of a type that cannot be posted, such as a load operation. The current operation (possibly as fused in block 912) is emitted. If the current operation specifies a destination register, an entry associated with the destination register is reset to the identity mapping. Processing continues with block 930.

In block 920, the current operation is fusible without emitting contents of any entries in the PORT. A PORT entry corresponding to a destination register of the current operation is modified to include a function of the current operation, considering operations represented by PORT entries of source operands and/or by constant operands of the current operation. Processing continues with block 930.

In block 930, the current operation is advanced in the operation stream to a next operation to be processed. Processing continues with block 940.

In block 940, it is determined if there are more operations in the operation stream to be processed. If there are more operations to be processed, processing returns to block 906 to process the new, current operation. If there are no more operations to be processed, processing continues with block 942.

In block 942, entries in the PORT are examined, and operations emitted for any entries that contain a pending operation. In various embodiments, a pending operation is represented by a non-identity mapping. In various embodiments, a pending operation is represented by a non-null mapping. Processing ends with block 948.

EXAMPLE EMBODIMENTS

In some embodiments, instructions compatible with a reference architecture are translated into operations compatible with a target architecture, the translating carried out by a hardware translating agent within a processor, the translating producing a sequence of operations that is then optimized by, one or more times, selecting a collection of the operations of the sequence of operations and emitting a fused operation in place of the collection.

In some embodiments, instructions compatible with a reference architecture are translated into operations compatible with a target architecture, the translating carried out by a hardware translating agent within a processor, the translating producing a sequence of operations that is then optimized by, one or more times, selecting a collection of the operations of the sequence of operations and replacing at least some of the operations of the collection with a fused operation. In some embodiments, all of the operations of the collection are replaced by the fused operation.

In some embodiments, instructions compatible with a reference architecture are translated into operations compatible with a target architecture, the translating carried out by a hardware translating agent within a processor, a trace of operations is built from a sequence of the operations, produced via the translating, and the trace is then optimized by, one or more times, selecting a collection of the operations of the trace and emitting a fused operation in place of the collection. In various embodiments, the sequence of the operations is in accordance with a predicted execution order. In some embodiments, the trace is selectively committed or aborted as a single entity.

In some embodiments, instructions compatible with a reference architecture are translated into operations compatible with a target architecture, the translating carried out by a hardware translating agent within a processor, a trace of operations is built from a sequence of the operations, produced via the translating, and the trace is then optimized by, one or more times, selecting a collection of the operations of the trace and replacing at least some of the operations of the collection with a fused operation. In various embodiments, the sequence of the operations is in accordance with a predicted execution order. In some embodiments, the trace is selectively committed or aborted as a single entity. In some embodiments, all of the operations of the collection are replaced by the fused operation.

In some embodiments, a sequence of operations is optimized by, one or more times, selecting a collection of operations of the sequence of operations and emitting a fused operation in place of the collection, wherein a particular collection comprises an assert operation and one or more other operations, and a fused assert operation is emitted based on the collection.

In some embodiments, a sequence of operations is optimized by, one or more times, selecting a collection of operations of the sequence of operations and replacing at least some of the operations of the collection with a fused operation, wherein a particular one of the respective fused operations is generated based on a particular one of the respective collections, and the particular collection comprises an assert operation and one or more other operations. In some embodiments, all of the operations of the collection are replaced by the fused operation.

In some embodiments, repeatedly, a collection of operations is selected from among operations of a sequence of operations, a fused operation is generated based on the collection, and at least some of the operations of the collection are replaced with the fused operation. In some embodiments, all of the operations of the collection are replaced by the fused operation. In some embodiments, a particular one of the fused operations is generated based on a particular one of the collections, the particular collection comprising an assert operation and one or more other operations. In some embodiments, the at least some of the operations of the particular collection include the assert operation.

In some embodiments, instructions compatible with a reference architecture are translated into operations compatible with a target architecture, the translating carried out by a hardware translating agent within a processor, and a plurality of register operations, produced via translating one or more instructions, are formed into a fused operation. In some embodiments, the operations compatible with the target architecture are compatible with execution by the processor.

In some embodiments, instructions compatible with a reference architecture are translated into operations compatible with a target architecture, the translating carried out by a hardware translating agent within a processor, the translating producing a sequence of operations that is then optimized by, one or more times, selecting a collection comprising a plurality of register operations from the sequence of operations, generating a fused operation based on the collection, and replacing at least some of the operations of the collection with the fused operation. In some embodiments, all of the operations of the collection are replaced by the fused operation. In some embodiments, one or more of the operations in a particular one of the collections is not a register operation. In some embodiments, one or more of the operations in the particular collection is an assert operation. In various embodiments, a first one of the fused operations is generated from a first one of the collections, and a second one of the collections comprises the first fused operation.

In some embodiments, a hardware translation agent within a processor translates one or more instructions compatible with a reference architecture into a sequence of operations compatible with a target architecture, and an execution unit of the processor executes a function determined from a collection of the operations from the sequence of operations, the function specifying functionality based on at least two of the instructions. In various embodiments, the function is specified as a fused operation. In various embodiments, execution of the function utilizes all inputs of a three-or-more-input ALU. In various embodiments, the at least two instructions are not consecutive instructions in a predicted execution order. In various embodiments, the at least two instructions are both non-branch instructions. In various embodiments, at least one of the at least two instructions is a memory instruction.

In some embodiments, optimizing of a sequence of operations is carried out by a hardware fusing agent. In some embodiments, optimizing of a sequence of operations is carried out manually. In some embodiments, optimizing of a sequence of operations is carried out by a software fusing agent. In some embodiments, instructions compatible with a reference architecture are translated to produce the sequence of operations, and properties of the reference architecture are transparent to the software fusing agent.

In some embodiments, a trace is built from a sequence of operations by a hardware build agent within a processor. In some embodiments, a trace comprises a plurality of basic blocks. In some embodiments, a trace is selectively committed or aborted as a single entity. In some embodiments, a sequence of operations, such as a trace, is optimized, at least in part, by a hardware fusing agent within a processor. In some embodiments, the building and the optimizing occur at least partially overlapped in time.

In some embodiments, instructions compatible with a reference architecture are translated to produce a sequence of operations compatible with a target architecture, the reference architecture being a Complex Instruction Set Computer (CISC) architecture. In some embodiments, a target architecture instruction set comprises three-input ALU operations.

In some embodiments, optimizing operations of a trace selects for fusing a particular collection of operations of the trace comprising a first operation of the operations of the trace that reads a particular one or more registers, and one or more second operations of the operations of the trace that write at least one of the particular one or more registers. In some embodiments, the one or more second operations precede the first operation in accordance with a predicted execution order.

In some embodiments, optimizing selects for fusing a particular collection of operations comprising a first operation and a second operation, the first and the second operations being translated from distinct instructions, and the first and the second operations furthermore not being respective complete translations of two consecutive, in predicted execution order, instructions. In some embodiments, a first instruction is translated into a plurality of operations, the first operation being one of the plurality. In some embodiments, a first instruction is translated into a first group of one or more operations, the first operation being one of the first group, a second instruction is translated into a second group of one or more operations, the second operation being one of the second group, and the first and second instructions not being consecutive in the predicted execution order. In some embodiments, the first operation is all or part of a translation of a first instruction from a first basic block, and the second operation is all or part of a translation of a second instruction from a second basic block.

In some embodiments, the optimizing utilizes constant folding to replace a collection of operations with a fused operation.

In some embodiments, a first register instruction is translated into a first operation, a second register instruction is translated into a second operation, and the two operations are collected into a fused operation. In some embodiments, the fused operation has three distinct inputs. In some embodiments, the fused operation comprises two or more distinct arithmetic/logical operations. In some embodiments, the fused operation cannot be executed non-iteratively using only a single, two-input ALU. In some embodiments, the first and second instructions specify a modification of a portion of reference architectural state, and the fused operation specifies a modification of less than an equivalent portion of target architectural state. In some embodiments, the less than an equivalent portion is a portion that is determined to be read before being written, optionally assuming that execution follows a predicted execution order. In some embodiments, the less than an equivalent portion of target architectural state contains less than all of a target architecture destination register. In some usage scenarios, the first instruction specifies writing a particular reference architecture destination register, and the second instruction specifies reading the particular reference architecture destination register.

In some embodiments, instructions compatible with a reference architecture are translated into a sequence of operations compatible with a target architecture, and, one or more times, a fused operation is generated based on a collection of operations of the sequence of operations comprising a plurality of register operations. In various embodiments, a first one of the instructions compatible with the reference architecture is translated into one or more operations of the sequence of operations comprising a first register operation, and a second one of the instructions compatible with the reference architecture is translated into one or more operations of the sequence of operations comprising a second register operation, and a particular one of the fused operations is generated based on a particular one of the collections, the particular collection comprising the first register operation and the second register operation. In some embodiments, the first instruction and the second instruction are not sequential instructions in a predicted execution order. In some embodiments, the first instruction is from a first basic block, and the second instruction is from a second basic block.

In some embodiments, instructions compatible with a reference architecture are translated into a sequence of operations compatible with a target architecture, and, one or more times, a fused operation is generated based on a collection of operations of the sequence of operations comprising a plurality of non-branch operations. In various embodiments, a first one of the instructions compatible with the reference architecture is translated into one or more operations of the sequence of operations comprising a first non-branch operation, and a second one of the instructions compatible with the reference architecture is translated into one or more operations of the sequence of operations comprising a second non-branch operation, and a particular one of the fused operations is generated based on a particular one of the collections, the particular collection comprising the first non-branch operation and the second non-branch operation. In some embodiments, the first instruction and the second instruction are not sequential instructions in a predicted execution order. In some embodiments, the first instruction is from a first basic block, and the second instruction is from a second basic block.

In some embodiments, a first register instruction is translated into a first operation, a second register instruction is translated into a second operation, and the two operations are collected into a fused operation. In some embodiments, the second instruction specifies writing of a result to a portion less than all of a reference architecture destination register, and the fused operation specifies writing of the result to a same-sized portion of a target architecture destination register. In some embodiments, the same-sized portion of the target architecture destination register is less than all of the target architecture destination register. In some embodiments, the reference architecture destination register is a first reference architecture destination register, the first instruction specifies writing a second reference architecture destination register, and the second instruction specifies reading the second reference architecture destination register. In some embodiments, a remainder of the target architecture destination register is set to zero. In some embodiments, a remainder of the target architecture destination register is not modified. In some embodiments, the same-sized portion is a first portion, a remainder of the target architecture destination register is a second portion, and the second portion is set to a corresponding second portion of a second target architecture register holding at least some of a prior equivalent of the reference architecture destination register.

In some embodiments, a first register instruction is translated into a first operation, a second register instruction is translated into a second operation, and the two operations are collected into a fused operation. In some embodiments, the fused operation specifies a same modification of architectural state as the second operation. In some embodiments, both the first operation and the second operation specify modification of one or more status flags, and the fused operation specifies a modification of status flags as per the second operation. In some usage scenarios, the second operation specifies a use of a status flag result of the first operation that is implicitly passed in the fused operation.

In some embodiments, a first register instruction is translated into a first operation, a second register instruction is translated into a second operation, and the two operations are collected into a fused operation. In some embodiments, the second instruction specifies modification of a set of architectural flags of the reference architecture, and the fused operation specifies modification of a corresponding set of architectural flags of the target architecture. In some embodiments, the first instruction specifies modification of architectural flags. In some embodiments, the second instruction specifies modification of a set of architectural flags of the reference architecture, and the fused operation specifies modification of a subset of a corresponding set of architectural flags of the target architecture. In some embodiments, the subset is less than all of the corresponding set of architectural flags of the target architecture. In some embodiments, the subset is null. In some embodiments, the subset is a portion corresponding to flags that are determined to be read before being written, optionally assuming that execution follows a predicted execution order. In some embodiments, the fused operation is further optimized to only modify observable architectural state. In some embodiments, the observable architectural state comprises values of flags. In some embodiments, the observable architectural state comprises high-order portions of registers.

In some embodiments, a first register instruction is translated into a first operation, a second register instruction is translated into a second operation, and at least the two operations are collected into a fused operation. In some usage scenarios, a later operation of the collection of operations uses a status flag result of an earlier operation of the collection of operations that is implicitly passed in the fused operation. In some usage scenarios, an earlier operation of the collection of operations specifies a modification of a particular status flag that is not specified to be used by or modified by any later operation of the collection of operations, and the fused operation specifies a same modification of the particular status flag.

In some embodiments, a sequence of operations to be optimized comprises a series of basic blocks, and one or more basic blocks are optimized as a unit into a trace. In some embodiments, the trace is an atomic trace. In some embodiments, the trace is selectively committed or aborted as a single entity. In some embodiments, a span over which operations are collected is a trace.

In some embodiments, a branch instruction of a reference architecture is translated into an assert operation compatible with a target architecture, and the assert operation is then fused with another operation compatible with the target architecture, such as a register operation, to form a fused assert operation. In some embodiments, the assert operation specifies validation of a predicted direction of the branch instruction via examination of a same set of status flags as specified by the branch instruction. In some usage scenarios, assert operations, optionally as fused assert operations, are advanced to an earlier position in a sequence of operations so that a validation specified by the assert operation is executed more promptly. In some embodiments, translation of branch instructions into assert operations enables a plurality of basic blocks to form an atomic trace by translation of any interior branch instructions into assert operations. In some embodiments, interior branch instructions in a trace are translated into interior assert operations. In some usage scenarios, a register operation that specifies setting of status flags used by an assert operation is fused with the assert operation, and the status flags are implicitly passed between the operations. In further usage scenarios, the implicitly-passed status flags do not otherwise modify architectural state.

In some embodiments, a particular branch instruction is translated into a branch operation and is fused with a register operation into a fused reg-op/branch operation. In some embodiments, a trace is comprised of a series of basic blocks, and the register operation and the branch operation are from distinct basic blocks. In some embodiments, the register operation is at least a portion of a translation of a first instruction, the branch operation is at least a portion of a translation of a second instruction, and the first instruction and the second instruction are not sequential instructions in the predicted execution order. In some usage scenarios, the register operation is translated from a register instruction, the register instruction specifies setting of status flags used by the branch instruction, and the status flags are implicitly used in the fused reg-op/branch operation. In further usage scenarios, the implicitly-passed status flags do not otherwise modify architectural state. In some embodiments, the register instruction and the branch instruction are not adjacent, in a predicted execution order, instructions. In some embodiments, the register instruction and the branch instruction are in different basic blocks.

In some embodiments, instructions compatible with a reference architecture are translated into a sequence of operations compatible with a target architecture, a trace is built from the sequence of operations, and, one or more times, a fused operation is generated based on a collection of operations comprising a plurality of register operations. In various embodiments, a particular one of the collections comprises a branch operation and a register operation, and the particular collection generates a fused reg-op/branch operation. In various embodiments, a particular one of the instructions compatible with the reference architecture is translated into one or more operations of the operations of the trace, including the branch operation. In various embodiments, the particular instruction is a branch instruction. In various embodiments, the particular instruction is a loop instruction. In various embodiments, the trace comprises a plurality of basic blocks, and the register operation and the branch operation come from distinct ones of the basic blocks. In various embodiments, a first one of the instructions compatible with the reference architecture is translated into a first group of operations of the operations of the trace, the first group comprising the register operation, a second one of the instructions compatible with the reference architecture is translated into a second group of operations of the operations of the trace, the second group comprising the branch operation, and the first instruction and the second instruction are not sequential instructions in a predicted execution order.

In some embodiments, each selected collection of operations for optimizing is chosen from a region of consecutive operations in a trace. In some embodiments, the region is a window that moves during the optimizing. In some embodiments, the window is a fixed size. In some embodiments, the window is a variable size. In some embodiments, the window extends from a current operation until a last operation of the trace. In some embodiments, the window moves in predicted execution order. In some embodiments, the window is stationary during the optimizing.

In some embodiments, a Pending Operation Renaming Table (PORT) is used to select collections of operations for optimizing. In some embodiments, operations are processed in a predicted execution order, and either added to the PORT or emitted immediately. In some embodiments, adding an operation to the PORT fuses the operation with a previous operation already in the PORT. In some embodiments, an operation cannot be added to the PORT until other operations already in the PORT are emitted. In some embodiments, the PORT is used to process a trace of operations, and operations appearing anywhere in the trace are selectable as a collection of operations for optimizing.

In some embodiments, instructions in one or more sequential basic blocks in an instruction stream are translated into operations. In some embodiments, multiple instructions are translated into a single operation. In some embodiments, one instruction is translated into multiple operations.

In some embodiments, a single basic block comprises a plurality of traces. In some embodiments, a trace is a sequence of one or more basic blocks from an instruction stream. In some embodiments, a trace is a sequence of one or more basic blocks from an instruction stream wherein instructions have been translated into operations. In some embodiments, a trace is a sequence of one or more basic blocks from an instruction stream wherein instructions have been translated into operations and further optimized.

In some embodiments, grouping of one or more basic blocks into one or more traces is dynamic. In various embodiments and/or circumstances, a number of instructions or basic blocks in a trace and boundaries of the trace change as an instruction stream executes. In some embodiments, a grouping of one or more basic blocks into one or more traces is controlled, at least in part, by information in an instruction image containing the basic blocks. In some embodiments, a grouping of one or more basic blocks into one or more traces is determined, at least in part, by software.

CONCLUSION

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible consistent with the description and are within the scope of the claims of the issued patent. For example, interconnect and function-unit bit-widths, clock speeds, and the type of technology used are variable according to various embodiments in each component block. Names given to interconnect and logic are merely descriptive, and should not be construed as limiting the concepts described. The order and arrangement of flowchart and flow diagram process, action, and function elements are variable according to various embodiments. Also, unless specifically stated to the contrary, value ranges specified, maximum and minimum values used, or other particular specifications, are merely those of the described embodiments, are expected to track improvements and changes in implementation technology, and should not be construed as limitations.

Functionally equivalent techniques known in the art are employable instead of those described to embody various components, sub-systems, functions, operations, routines, and sub-routines. It is also understood that many functional aspects of embodiments are realizable selectively in either hardware (i.e., generally dedicated circuitry) or software (i.e., via some manner of programmed controller or processor), as a function of embodiment dependent design constraints and technology trends of faster processing (facilitating migration of functions previously in hardware into software) and higher integration density (facilitating migration of functions previously in software into hardware). Specific variations in various embodiments include, but are not limited to: differences in partitioning; different form factors and configurations; use of different operating systems and other system software; use of different interface standards; details of reference and/or target architectures, such as a number or type of flags, a number or size of registers; details of reference and/or target instruction set architectures, such as a number of format of instructions or operations, encodings of instructions or operations, capabilities of instructions or operations; a number of or details of coupling of units in a core of a processor; a number of or details of coupling of cores and other units in a processor; number of entries or stages in registers and buffers; and other variations to be expected when implementing the concepts described herein in accordance with the unique engineering and business constraints of a particular application.

The embodiments have been described with detail and environmental context well beyond that required for a minimal implementation of many aspects of the embodiments described. Those of ordinary skill in the art will recognize that some embodiments omit disclosed components or elements without altering basic cooperation among the remaining elements. It is thus understood that much of the details described are not required to implement various aspects of the embodiments described. To the extent that the remaining elements are distinguishable from the prior art, components and features that are omitted are not limiting on the embodiments described herein.

Certain choices have been made in the description merely for convenience in preparing the text and drawings and unless there is an indication to the contrary the choices should not be construed per se as conveying additional information regarding structure or operation of the embodiments illustrated. Illustrative examples of the choices of convenience include: the particular organization or assignment of the designations used for the figure numbering and the particular organization or assignment of the element identifiers (i.e., the callouts or numerical designators) used to identify and reference the features and elements of the embodiments.

All such variations in embodiments comprise insubstantial changes over the teachings conveyed by the described embodiments. It is also understood that the embodiments described herein have broad applicability to other computing applications, and are not limited to the particular application or industry of the described embodiments. The invention is thus to be construed as including all possible modifications and variations encompassed within the scope of the claims of the issued patent.

The invention claimed is:

1. A method comprising:
obtaining an instruction image comprising a plurality of basic blocks (BBs), wherein each of the plurality of BBs ends with one of a plurality of branch instructions;
generating a first trace for a target architecture by translating a first instruction of a first BB, a second instruction of the first BB, and a branch instruction ending the first BB into a first operation, a second operation, and an assertion operation, respectively, compatible with the target architecture, wherein the second instruction is predicted to execute prior to the branch instruction;
searching, within a search window having a span excluding the assertion operation, a plurality of operations including the first operation and the second operation for operations to pair;
moving the search window to include the assertion operation within the span of the search window;
identifying, after moving the search window, the first operation and the assertion operation as a pair within the search window; and
fusing the first operation with the assertion operation to create a first fused operation, wherein the first fused operation is predicted to be executed prior to the second operation,
wherein identifying the pair comprises:
determining a first portion and a second portion within a register written to by the first instruction,
wherein the second instruction writes the second portion of the register, and
wherein the branch instruction reads the first portion of the register to evaluate a condition of the branch instruction.

2. The method of claim 1, wherein identifying the pair comprises:
determining a flag set by the first instruction and consumed as a condition in the branch instruction, wherein the first fused operation passes the flag from part of the first fused operation corresponding to the first operation as a part of the first fused operation corresponding to the assert operation, and wherein the second instruction executes independently of the flag.

3. The method of claim 1, further comprising enlarging the search window.

4. The method of claim 1, further comprising:
translating a third instruction of the first BB into a third operation compatible with the target architecture;
identifying, within the search window, the second operation and the third operation for pairing; and
fusing the second operation with the third operation to create a second fused operation,
wherein the first trace includes the second fused operation.

5. The method of claim 1, further comprising:
generating a second trace for a target architecture by translating a first instruction of a second BB and a branch instruction ending the second BB into a third operation, and a second assertion operation, respectively, compatible with the target architecture.

6. The method of claim 5, wherein the second trace is predicted to execute before the first trace.

7. The method of claim 1, wherein the assertion operation aborts the first trace.

8. The method of claim 1, wherein predicted execution order adheres to the dependencies within the instruction image.

9. A system comprising:
an instruction image comprising a plurality of basic blocks (BBs), wherein each of the plurality of BBs ends with one of a plurality of branch instructions compatible with a reference architecture;
a translating agent configured to translate a first instruction of a first BB, a second instruction of the first BB, and a branch instruction ending the first BB into a first operation, a second operation, and an assertion operation, respectively, compatible with the target architecture, wherein the second instruction is predicted to execute prior to the branch instruction;

a trace-building unit configured to generate a first trace by:
searching, within the search window having a span excluding the assertion operation, a plurality of operations including the first operation and the second operation for operations to pair;
moving the search window to include the assertion operation within the span of the search window; and
identifying, after moving the search window, the first operation and the assertion operation as a pair within the search window; and
a fusing agent configured to fuse the first operation with the assertion operation to create a first fused operation, wherein the first fused operation is predicted to be executed prior to the second operation,
wherein the pair comprises:
a register having a first portion and a second portion written to by the first instruction,
wherein the second instruction writes the second portion of the register, and
wherein the branch instruction reads the first portion of the register to evaluate a condition of the branch instruction.

10. The system of claim 9, wherein the pair comprises:
a flag set by the first instruction and consumed as a condition in the branch instruction, wherein the first fused operation passes the flag from part of the first fused operation corresponding to the first operation the a part of the first fused operation corresponding to the assert operation, and wherein the second instruction executes independently of the flag.

11. The system of claim 9, wherein the pair comprises:
a register having a first portion and a second portion written to by the first instruction,
wherein the second instruction writes the second portion of the register, and
wherein the branch instruction reads the first portion of the register to evaluate a condition of the branch instruction.

12. The system of claim 9, further comprising:
wherein the translating agent is further configured to:
translate a third instruction of the first BB into a third operation compatible with the target architecture; and
identify, within the search window, the second operation and the third operation for pairing,
wherein the fusing agent is further configured to:
fuse the second operation with the third operation to create a second fused operation,
wherein the first trace includes the second fused operation.

13. The system of claim 9, further comprising:
wherein the trace-building agent is further configured to:
generate a second trace for a target architecture by translating a first instruction of a second BB and a branch instruction ending the second BB into a third operation, and a second assertion operation, respectively, compatible with the target architecture.

14. The system of claim 13, wherein the second trace is predicted to execute before the first trace.

15. The system of claim 9, wherein the assertion operation aborts the first trace.

16. The system of claim 9, wherein predicted execution order adheres to the dependencies within the instruction image.

* * * * *